(12) United States Patent
Tabata et al.

(10) Patent No.: US 11,242,928 B2
(45) Date of Patent: Feb. 8, 2022

(54) CONTROL APPARATUS FOR VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Hiromasa Tatsushiro, Toyota (JP); Kota Fujii, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/069,456

(22) Filed: Oct. 13, 2020

(65) Prior Publication Data

US 2021/0108719 A1 Apr. 15, 2021

(30) Foreign Application Priority Data

Oct. 11, 2019 (JP) .............................. JP2019-188225

(51) Int. Cl.
*F16H 61/00* (2006.01)
*F16H 61/06* (2006.01)

(52) U.S. Cl.
CPC ... *F16H 61/061* (2013.01); *F16H 2061/0087* (2013.01); *F16H 2061/062* (2013.01)

(58) Field of Classification Search
CPC ........... F16H 61/061; F16H 2061/0087; F16H 2061/062
See application file for complete search history.

(56) References Cited

U.S. PATENT DOCUMENTS

| 6,875,152 B2* | 4/2005 | Iwatuki | B60W 10/06 475/210 |
| 8,924,110 B2* | 12/2014 | Iraha | F16H 61/66259 701/60 |
| 10,747,224 B2* | 8/2020 | Michalakis | B60W 60/0015 |
| 2021/0125431 A1* | 4/2021 | McGill | G06N 20/00 |

FOREIGN PATENT DOCUMENTS

| JP | H09-126016 A | 5/1997 |
| JP | 2013-155685 A | 8/2013 |
| JP | 2017-048800 A | 3/2017 |

\* cited by examiner

*Primary Examiner* — Justin Holmes
(74) *Attorney, Agent, or Firm* — Oliff PLC

(57) ABSTRACT

A vehicle control apparatus includes a learning control portion configured to execute a learning control operation, and to limit a learning value obtained through the learning control operation, by a guard value, and an update control portion configured to obtain a new guard value from an external device, and to update the guard value to the new guard value. The update control portion limits the learning value by the new guard value, prior to execution of the learning control operation, such that the learning value is rewritten, by the update control portion, to a value within a new guard-value range defined by the new guard value in a case in which the learning value is deviated from the new guard-value range, and such that the learning value is kept unchanged by the update control portion in a case in which the learning value is within the new guard-value range.

4 Claims, 10 Drawing Sheets

| RANGE | AT GEAR POSITION | ENGAGEMENT DEVICES ||||| SOLENOIDS ||||||
|---|---|---|---|---|---|---|---|---|---|---|---|---|
| | | C1 | C2 | B1 | B2 | F1 | SL1 | SL2 | SL3 | SL4 | SC1 | SC2 |
| P | 1st | ○ | | | ○ | | ○ | | | ○ | ○ | ○ |
| R | 1st | ○ | | | ○ | | ○ | | | ○ | ○ | ○ |
| N | FORWARD 1st | ○ | | | ○ | | ○ | | | ○ | ○ | |
| | REVERSE 1st | ○ | | | ○ | | ○ | | | ○ | ○ | ○ |
| D | 1st | ○ | | | △ | ○ | ○ | | | △ | ○ | |
| | 2nd | ○ | | ○ | | | ○ | | ○ | | ○ | |
| | 3rd | ○ | ○ | | | | ○ | ○ | | | ○ | |
| | 4th | | ○ | ○ | | | | ○ | ○ | | ○ | |

| ACCELERATOR OPENING DEGREE θacc(%) | LEARNING VALUE LRN |
|---|---|
| 0-25 | ΔPc2-1 |
| 25-50 | ΔPc2-2 |
| 50-75 | ΔPc2-3 |
| 75-100 | ΔPc2-4 |

CONTROL APPARATUS FOR VEHICLE

This application claims priority from Japanese Patent Application No. 2019-188225 filed on Oct. 11, 2019, the disclosure of which is herein incorporated by reference in its entirety.

FIELD OF THE INVENTION

The present invention relates to a control apparatus for a vehicle, wherein the control apparatus includes a learning control portion configured to execute a learning control operation and to limit a learning value obtained through the learning control operation, by a guard value.

BACKGROUND OF THE INVENTION

There is widely known a control apparatus for a vehicle, wherein the control apparatus includes a learning control portion configured to execute a learning control operation and to limit a learning value obtained through the learning control operation, by a guard value. JP-2013-155685A discloses an example of such a control apparatus. In the control apparatus disclosed in the Japanese Patent Application Publication, discharge characteristics of a fuel pump are subjected to the learning control operation, and the learning value obtained through the learning control operation is limited by a predetermined guard value. Further, in the disclosed control apparatus, a second guard value for a re-learning control operation is determined based on a first-time learning value, and a second-time learning value obtained through the re-learning control operation is limited by the second guard value.

SUMMARY OF THE INVENTION

By the way, in the conventional control apparatus as described above, for example, it might be possible to update the guard value concurrently with update of a control program in accordance with which a control portion is to execute a certain control operation by using the learning value. In that case, it is common that the learning value, to which, for example, an individual difference of each device or apparatus is reflected by repeated learning, is not updated, so that the learning value is limited by the updated guard value in the next execution of the learning control operation. That is, even when the learning value is deviated from a range defined by the updated guard value, the learning value is still effective until the learning value is rewritten by the updated guard value in the next execution of the learning control operation. Therefore, if the certain control operation is executed in accordance with the updated control program by using the learning value that is deviated from the updated guard value, the controllability could be reduced.

The present invention was made in view of the background art described above. It is therefore an object of the present invention to make it possible, in a case in which a guard value for limiting a learning value is updated, to appropriately execute a control operation using the learning value, even before execution of a learning control operation to which the updated guard value is applied.

The object indicated above is achieved according to the following aspects of the present invention.

According to a first aspect of the invention, there is provided a control apparatus for a vehicle, the control apparatus comprising: a learning control portion configured to execute a learning control operation, and to limit a learning value obtained through the learning control operation, by a guard value; and an update control portion configured to obtain a new guard value from an external device, and to update the guard value to the new guard value, wherein the update control portion limits the learning value by the new guard value, prior to execution of the learning control operation, such that the learning value is rewritten, by the update control portion, to a value within a new guard-value range defined by the new guard value in a case in which the learning value is deviated from the new guard-value range, and such that the learning value is kept unchanged by the update control portion in a case in which the learning value is within the new guard-value range.

According to a second aspect of the invention, in the control apparatus according to the first aspect of the invention, there is provided a learning-value-use control portion configured to execute a certain control operation by using the learning value, in accordance with a control program, wherein the update control portion obtains, from the external device, an update software relating to the control program, together with the new guard value, and updates the control program concurrently with update of the guard value to the new guard value. It is preferable that the update control portion limits the learning value by the new guard value, prior to execution of the certain control operation by the learning-value-use control portion.

According to a third aspect of the invention, in the control apparatus according to the first or second aspect of the invention, the update control portion downloads, from the external device via a wireless communication, an update software including the new guard value, and updates the guard value to the new guard value.

According to a fourth aspect of the invention, in the control apparatus according to any one of the first through third aspects of the invention, there is provided a shift control portion configured to execute a shift control operation in an automatic transmission provided in the vehicle, in accordance with a shift control program, by controlling a hydraulic pressure of a hydraulically-operated frictional engagement device that is involved in the shift control operation, wherein the learning control portion executes the learning control operation for a control parameter relating to the hydraulic pressure of the hydraulically-operated frictional engagement device, such that the shift control operation is executed in a predetermined target state, wherein the learning control portion limits the learning value of the control parameter by the guard value, wherein the shift control portion controls the hydraulic pressure of the hydraulically-operated frictional engagement device, by using the learning value of the control parameter, and wherein the update control portion obtains, from the external device, an update software relating to the shift control program and the guard value, and updates the shift control program and the guard value, concurrently with each other.

In the control apparatus according to the invention, when the new guard value is obtained from the external device and the previous guard value has been updated to the new guard value, the learning value is limited by the new guard value, prior to execution of the learning control operation. That is, in the case in which the learning value is deviated from the new guard-value range, the learning value is rewritten to the value within the new guard-value range defined by the new guard value. In the case in which the learning value is within the new guard-value range, the learning value is kept unchanged so that outcomes obtained through the executed learning control operation is maintained. Thus, even shortly after the update of the guard value, a control operation using the learning value can be appropriately executed.

In the control apparatus according to the second aspect of the invention, the update software relating to the control program (in accordance with which the learning-value-use control portion is to execute the certain control operation by using the learning value) is obtained together with the new guard value, and the control program is updated concurrently with update of the guard value to the new guard value. The guard value is updated to the new guard value, as needed, such that the certain control operation can be appropriately executed in accordance with the updated control program. Thus, with the learning value being limited by the new guard value prior to execution of the learning control operation, the certain control operation using the learning value can be appropriately executed in accordance with the updated control program, even shortly after the update of the guard value.

In the control apparatus according to the third aspect of the invention, the update software including the new guard value is obtained by downloading the update software from the external device via the wireless communication. Thus, the update of the guard value can be made in a simple manner.

In the control apparatus according to the fourth aspect of the invention, the shift control operation is executed in the automatic transmission provided in the vehicle, in accordance with the shift control program, by controlling the hydraulic pressure of the hydraulically-operated frictional engagement device that is involved in the shift control operation, and the control parameter relating to the hydraulic pressure of the hydraulically-operated frictional engagement device is subjected to the learning control operation such that the shift control operation is executed in the predetermined target state. When the shift control program is updated, the guard value is also updated to the new guard value, as needed, such that the shift control operation can be appropriately executed in accordance with the updated shift control program. Therefore, upon updates of the shift control program and the guard value, if the learning value is deviated from the new guard-value range, a shifting trouble such as a shifting shock could be caused in execution of the shift control operation in accordance with the updated shift control program. However, owing to the feature of the present invention, which is that the learning value is limited by the new guard value prior to the execution of the learning control operation or the shift control operation, the shift control operation using the learning value can be appropriately executed in accordance with the updated shift control program, even shortly after the update of the guard value, so that it is possible to prevent the shifting trouble such as the shifting shock.

DETAILED DESCRIPTION OF PREFERRED EMBODIMENT

Figure 1:
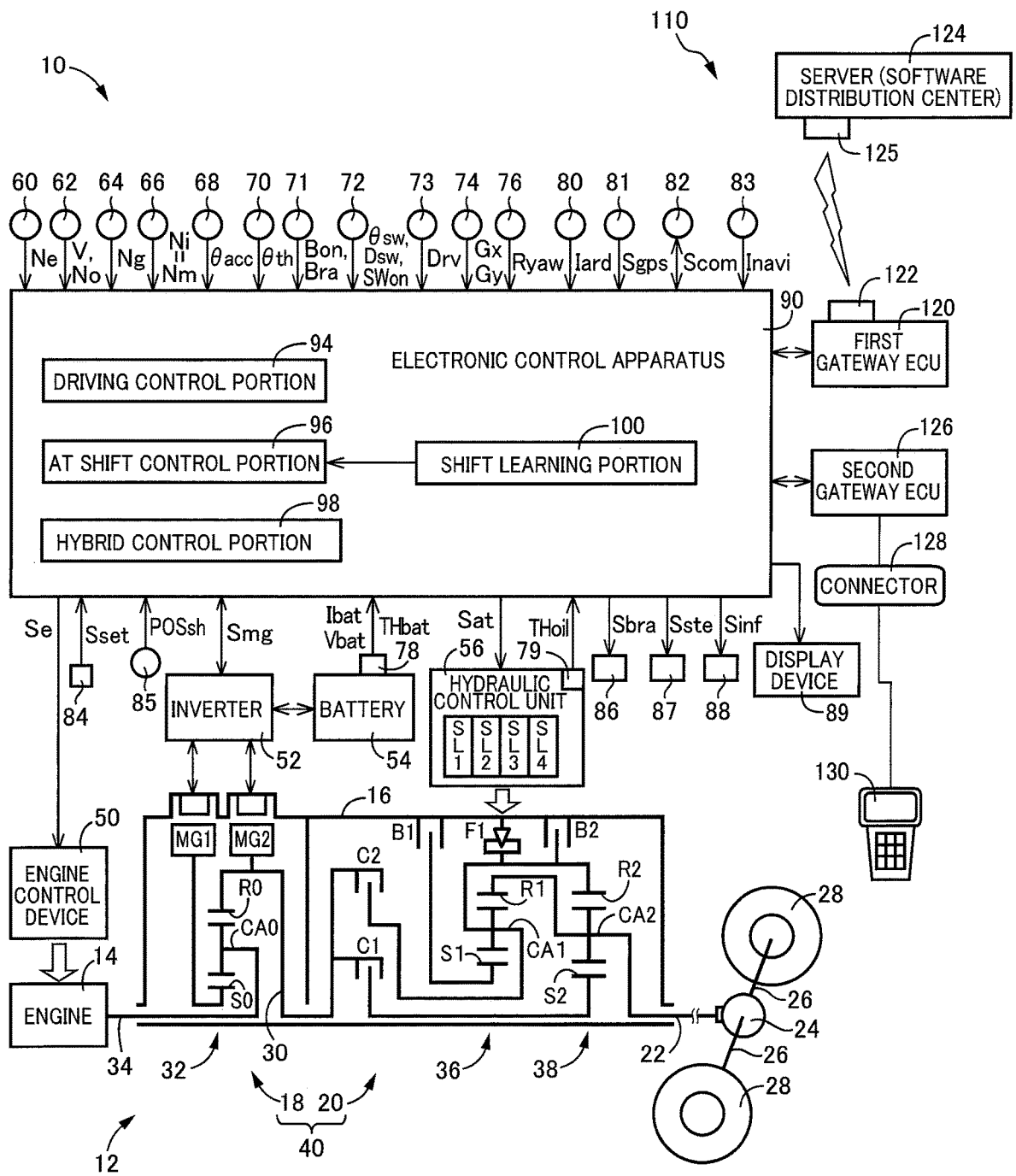
FIG. 1 is a view schematically showing a construction of a vehicle including a control apparatus as an embodiment of the present invention, for explaining major portions of control functions and control systems that are provided to perform various control operations in the vehicle.

The present invention is advantageously applied to, for example, a learning control for a control parameter relating to a hydraulic pressure of a hydraulically-operated frictional engagement device that is involved in a shift control operation in an automatic transmission. However, the invention is applicable also to various learning controls relating to, for example, an output control (e.g., an idling-rotational-speed control) for a drive force source such as an engine, a brake hydraulic-pressure control for a service brake, an auto-cruise control, and an automatic drive control. There are known various learning controls executed for, for example, learning various control parameters based on a target state, learning detected values of sensors provided in a vehicle, and learning a characteristic of a relationship between a stress and a rotational angle of a rotary member such as a damper. The control parameter relating to the hydraulic pressure of the hydraulically-operated frictional engagement device of the automatic transmission is, for example, a stand-by pressure, a stand-by time, and a change rate of the hydraulic pressure when the hydraulic pressure is changed, and the learning control operation is executed to learn a learning value, for example, such that an overshoot or an undershoot of an input rotational speed is held within a target range, such that a tie-up is not caused during a shifting action, or such that a length of time required to complete the shifting action is held within a target range. Further, regarding the learning of the hydraulic pressure of the hydraulically-operated frictional engagement device of the automatic transmission, there are known various learning controls that are to be executed for various kinds of shifting actions such as a shift-up action, a shift-down action, a shifting action executed in a power ON state and a shifting action executed in a power OFF state.

The vehicle may be any vehicle that is caused to run by a drive force source such as an engine and an electric motor. The vehicle may be any one of an electric vehicle, a hybrid vehicle and an engine-drive vehicle. Further, the vehicle may be a vehicle that does not include a transmission.

The learning value, which is obtained through the learning control operation, is, preferably, a correction or compensation amount by which a reference value (such as an initial value) of a control parameter is to be increased or reduced. However, the learning value may be a reference value itself so that the reference value is changed to the learning value. The guard value is set to a value for limiting only an upper limit of the learning value, only a lower limit of the learning value or each of the upper and lower limits of the learning value.

The update control portion may update only the guard value, or alternatively, may update not only the guard value but also other data and programs. The term "software", which is used in the following description, may be interpreted to include both of the data and the programs, or alternatively, interpreted to include only the data or only the programs. The update of the guard value and the other data and programs by the update control portion may be automatically executed based on an update command from the external device such as a software distribution center, or may be executed when a user or operator's intention to execute the update has been confirmed. The external device is a device provided outside the vehicle. Further, the update may be executed in accordance with the update command issued by, for example, a maintenance shop engineer of a car dealer (car sales company) in a periodic inspection made in, for example, the car dealer. The update control portion executes an updating operation, by downloading update software (including the new guard value to which the current guard value is to be updated) from the external device, via a network of a wireless communication such as a wireless LAN network and a OTA (Over-The-Air) i.e., a mobile phone network. However, the updating operation may be executed by obtaining the update software via a wire communication from an update tool that is mechanically detachably connected to the vehicle. The update tool may be constituted by, for example, a personal computer, a tablet computer or a dedicated device, and may store therein the softwares that have been installed through download made via a wire or wireless communication, or installed through a recording medium.

Embodiment

Hereinafter, preferred embodiment of the invention will be described in detail with reference to the accompanying drawings.

FIG. 1 is a view schematically showing a construction of a drive-force transmitting device 12 provided in a vehicle 10 to which the present invention is applied, for explaining major portions of control functions and control systems that are provided to perform various control operations in the vehicle 10. As shown in FIG. 1, the vehicle 10 includes an engine 14 and first and second rotating machines MG1, MG2. The drive-force transmitting device 12 includes a non-rotary member in the form of a transmission casing 16 that is attached to a body of the vehicle 10, an electrically-operated continuously-variable transmission portion 18 and a mechanically-operated step-variable transmission portion 20. The continuously-variable transmission portion 18 and the step-variable transmission portion 20 are provided within the casing 16, and are arranged in a series on a common axis. The continuously-variable transmission portion 18 is connected to the engine 14 directly or indirectly through, for example, a damper (not shown). The step-variable transmission portion 20 is connected to an output rotary member of the continuously-variable transmission portion 18. The drive-force transmitting device 12 further includes a differential gear device 24 connected to an output shaft 22 that is an output rotary member of the step-variable transmission portion 20, and a pair of axles 26 connected to the differential gear device 24. In the drive-force transmitting device 12, a drive force outputted from the engine 14 or the second rotating machine MG2 is transmitted to the step-variable transmission portion 20, and is then transmitted from the step-variable transmission portion 20 through the differential gear device 24 to drive wheels 28 of the vehicle 10, for example. The drive force is synonymous with a drive torque or a drive power unless otherwise distinguished from them. It is noted that the drive-force transmitting device 12 including the continuously-variable transmission portion 18 and the step-variable transmission portion 20 is constructed substantially symmetrically about its axis corresponding to the above-described common axis, so that a lower half of the drive-force transmitting device 12 is not shown in FIG. 1. The above-described common axis corresponds to axes of a crank shaft of the engine 14 and a connecting shaft 34 that is described below.

The engine 14 is a known internal combustion engine such as gasoline engine and diesel engine, which serves as a drive force source capable of generating a drive torque. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 14, is controlled. In the present embodiment, the engine 14 is connected to the continuously-variable transmission portion 18, without a fluid transmitting device (such as a torque converter and a fluid coupling device) disposed therebetween.

Each of the first and second rotating machines MG1, MG2 is a rotating electric machine having a function serving as an electric motor and a function serving as a generator. That is, each of the first and second rotating machines MG1, MG2 is a so-called "motor generator". The first and second rotating machines MG1, MG2 are connected to an electric storage device in the form of a battery 54 provided in the vehicle 10, through an inverter 52 provided in the vehicle 10.

The inverter 52 is controlled by the electronic control apparatus 90 whereby an MG1 torque Tg and an MG2 torque Tm as output torques of the respective first and second rotating machines MG1, MG2 are controlled. The output torque of each of the first and second rotating machines MG1, MG2 serves as a power running torque when acting as a positive torque for acceleration, and serves as a regenerative torque when acting as a negative torque for deceleration. The battery 54 is the electric storage device to and from which an electric power is supplied from and to the first rotating machine MG1 and the second rotating machine MG2.

The continuously-variable transmission portion 18 is provided with: the above-described first rotating machine (first motor/generator) MG1; a differential mechanism 32 serving as a drive-force distributing device to mechanically distribute the drive force of the engine 14 to the first rotating machine MG1 and to an intermediate transmitting member 30 that is an output rotary member of the continuously-variable transmission portion 18; and the second rotating machine (second motor/generator) MG2 connected to the intermediate transmitting member 30 in a drive-force transmittable manner. The continuously-variable transmission portion 18 is an electrically-controlled continuously-variable transmission wherein a differential state of the differential mechanism 32 is controllable by controlling an operation state of the first rotating machine MG1. The first rotating machine MG1 serves as a differential rotating machine capable of controlling an engine rotational speed Ne that is a rotational speed of the engine 14. The second rotating machine MG2 serves as a vehicle-driving rotating machine, i.e., a drive force source capable of generating a drive torque driving the vehicle 10. The vehicle 10 is a hybrid vehicle provided with the drive force sources in the form of the engine 14 and the second rotating machine MG2. The drive force of each of the drive force sources is to be transmitted to the drive wheels 28 through the drive-force transmitting device 12.

The differential mechanism 32 is a planetary gear device of a single-pinion type having a sun gear S0, a carrier CA0 and a ring gear R0. The carrier CA0 is connected to the engine 14 through the connecting shaft 34 in a drive-force transmittable manner, and the sun gear S0 is connected to the first rotating machine MG1 in a drive-force transmittable manner, while the ring gear R0 is connected to the intermediate transmitting member 30 and the second rotating machine MG2 in a drive-force transmittable manner. In the differential mechanism 32, the carrier CA0 serves as an input rotary element, and the sun gear S0 serves as a reaction rotary element, while the ring gear R0 serves as an output rotary element.

The step-variable transmission portion 20 is a mechanically-operated transmission mechanism which constitutes a part of a drive-force transmitting path between the intermediate transmitting member 30 and the drive wheels 28, namely, constitutes a part of a drive-force transmitting path between the continuously-variable transmission portion 18 and the drive wheels 28. The intermediate transmitting member 30 also serves as an input rotary member of the step-variable transmission portion 20. The step-variable transmission portion 20 is considered to also as a vehicle transmission constituting a part of a drive-force transmitting path between the drive force source (second rotating machine MG2 or engine 14) and the drive wheels 28, since the second rotating machine MG2 is connected to the intermediate transmitting member 30 such that the intermediate transmitting member 30 is rotated together with the second rotating machine MG2, or since the engine 14 is connected to an input rotary member of the continuously-variable transmission portion 18. The intermediate transmitting member 30 is a transmitting member through which the drive force of the drive force source is to be transmitted to the drive wheels 28. The step-variable transmission portion 20 is a known automatic transmission of a planetary gear type which is provided with a plurality of planetary gear devices in the form of a first planetary gear device 36 and a second planetary gear device 38, a one-way clutch F1, and a plurality of engagement devices including a clutch C1, a clutch C2, a brake B1 and a brake B2. Hereinafter, the clutch C1, clutch C2, brake B1 and brake B2 will be referred to as engagement devices CB unless otherwise specified.

Each of the engagement devices CB is a hydraulically-operated frictional engagement device in the form of a multiple-disc type or a single-disc type clutch or brake that is to be pressed by a hydraulic actuator, or a band brake that is to be tightened by a hydraulic actuator. The engagement devices CB are selectively placed in engaged, slipped or released states as the operation states, with engaging torques Tcb as torque capacities being changed by engaging hydraulic pressures Pcb as regulated pressures supplied from linear solenoid valves SL1-SL4 of a hydraulic control unit (hydraulic control circuit) 56 provided in the vehicle 10. Thus, hydraulic pressures Pc1, Pc2, Pb1, Pb2 are hydraulic pressures supplied to the step-variable transmission portion 20.

In the step-variable transmission portion 20, selected ones of rotary elements of the first and second planetary gear devices 36, 38 are connected to each other or to the intermediate transmitting member 30, casing 16 or output shaft 22, either directly or indirectly (selectively) through the engagement devices CB or the one-way clutch F1. The rotary elements of the first planetary gear device 36 consist of three rotary elements in the form of a sun gear S1, a carrier CA1 and a ring gear R1 that are rotatable relative to one another. The rotary elements of the second planetary gear device 38 consist of three rotary elements in the form of a sun gear S2, a carrier CA2 and a ring gear R2 that are rotatable relative to one another.

The step-variable transmission portion 20 is shifted to a selected one of a plurality of AT gear positions (speed positions) by engaging actions of selected ones of the engagement devices CB. The plurality of AT gear positions have respective different gear ratios (speed ratios) γat (=AT input rotational speed Ni/output rotational speed No). Namely, the step-variable transmission portion 20 is shifted up or down from one gear position to another by placing selected ones of the engagement devices in the engaged state. The step-variable transmission portion 20 is a step-variable automatic transmission configured to establish a selected one of a plurality of gear positions. In the following description of the present embodiment, the gear position established in the step-variable transmission portion 20 will be referred to as AT gear position. The AT input rotational speed Ni is an input rotational speed of the step-variable transmission portion 20 that is a rotational speed of the input rotary member of the step-variable transmission portion 20, which is equal to a rotational speed of the intermediate transmitting member 30, and which is equal to an MG2 rotational speed Nm that is a rotational speed of the second rotating machine MG2. Thus, the AT input rotational speed Ni can be represented by the MG2 rotational speed Nm. The output rotational speed No is a rotational speed of the output shaft 22 that is an output rotational speed of the step-variable transmission portion 20, which is considered to be an output speed of a transmission device (composite transmission) 40 which consists of the continuously-variable transmission portion 18 and the step-variable transmission portion 20. The transmission device 40 is a transmission that constitutes a part of a drive-force transmitting path between the engine 14 and the drive wheels 28.

Figures 2, 3:
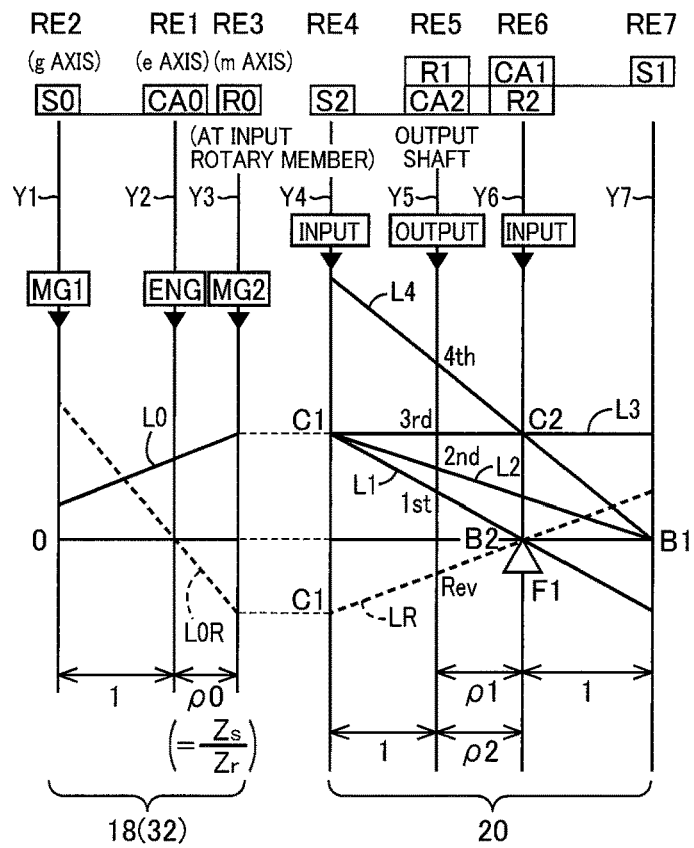
FIG. 2 is a table for explaining a relationship between each gear position of a mechanically-operated step-variable transmission portion (shown, by way of example, in FIG. 1) and a combination of engagement devices of the step-variable transmission portion (which are placed in engaged states to establish the gear position), together with an operation state of each solenoid.
FIG. 3 is a collinear chart in which a relationship among rotational speeds of rotary elements of an electrically-controlled continuously-variable transmission portion and the mechanically-operated step-variable transmission portion, which are shown, by way of example in FIG. 1, can be represented by straight lines.

As shown in a table of FIG. 2, the step-variable transmission portion 20 is configured to establish a selected one of a plurality of AT gear positions in the form of four forward AT gear positions. The four forward AT gear positions consist of a first speed AT gear position, a second speed AT gear position, a third speed AT gear position and a fourth speed AT gear position, which are represented by "1st", "2nd", "3rd" and "4th" in the table of FIG. 2. The first speed AT gear position is the lowest-speed gear position having a highest gear ratio γat, while the fourth speed AT gear position is the highest-speed gear position having a lowest gear ratio γat. The gear ratio γat decreases in the direction from the first speed AT gear position (lowest-speed gear position) toward the fourth speed AT gear position (highest-speed gear position). The table of FIG. 2 indicates a relationship between each of the AT gear positions of the step-variable transmission portion 20 and operation states of the respective engagement devices CB of the step-variable transmission portion 20, namely, a relationship between each of the AT gear positions and a combination of ones of the engagement devices CB, which are to be placed in theirs engaged states to establish the each of the AT gear positions. In the table of FIG. 2, "O" indicates the engaged state of the engagement devices CB, "Δ" indicates the engaged state of the brake B2 during application of an engine brake to the vehicle 10 or during a coasting shift-down action of the step-variable transmission portion 20, and the blank indicates the released state of the engagement devices CB.

The step-variable transmission portion 20 is configured to switch from one of the AT gear positions to another one of the AT gear positions, namely, to establish one of the AT gear positions which is selected, by the electronic control apparatus 90, according to, for example, an accelerating operation made by a vehicle driver (operator) and the vehicle running speed V. The step-variable transmission portion 20 is shifted up or down from one of the AT gear positions to another, for example, by so-called "clutch-to-clutch" shifting operation that is made by releasing and engaging actions of selected two of the engagement devices CB, namely, by a releasing action of one of the engagement devices CB and an engaging action of another one of the engagement devices CB. In the following description of the present embodiment, a shift down action from the second speed AT gear position to the first speed AT gear position will be referred to as shift-down action from 2nd to 1st. The other shift down and up actions will be referred in the same way.

FIG. 3 is a collinear chart in which a relative relationship of rotational speeds of the rotary elements in the continuously-variable transmission portion 18 and the step-variable transmission portion 20, can be represented by straight lines; In FIG. 3, three vertical lines Y1, Y2, Y3 corresponding to the three rotary elements of the differential mechanism 32 constituting the continuously-variable transmission portion 18 are a g-axis representative of the rotational speed of the sun gear S0 corresponding to a second rotary element RE2, an e-axis representative of the rotational speed of the carrier CA0 corresponding to a first rotary element RE1, and an m-axis representative of the rotational speed of the ring gear R0 corresponding to a third rotary element RE3 (i.e., the input rotational speed of the step-variable transmission portion 20) in order from the left side. Four vertical lines Y4, Y5, Y6, Y7 of the step-variable transmission portion 20 are axes respectively representative of the rotational speed of the sun gear S2 corresponding to a fourth rotary element RE4, the rotational speed of the ring gear R1 and the carrier CA2 connected to each other and corresponding to a fifth rotary element RE5 (i.e., the rotational speed of the output shaft 22), the rotational speed of the carrier CA1 and the ring gear R2 connected to each other and corresponding to a sixth rotary element RE6, and the rotational speed of the sun gear S1 corresponding to a seventh rotary element RE7 in order from the left. An interval between the vertical lines Y1, Y2, Y3 is determined in accordance with a gear ratio ρ0 of the differential mechanism 32. An interval between the vertical lines Y4, Y5, Y6, Y7 is determined in accordance with gear ratios ρ1, ρ2 of the first and second planetary gear devices 36, 38. When an interval between the sun gear and the carrier is set to an interval corresponding to "1" in the relationship between the vertical axes of the collinear chart, an interval corresponding to the gear ratio ρ (=a number Zs of teeth of the sun gear/a number Zr of teeth of the ring gear) of the planetary gear device is set between the carrier and the ring gear, since each of the differential mechanism 32 and planetary gear devices 36, 38 is a planetary gear device of a single-pinion type.

In representation using the collinear chart of FIG. 3, in the differential mechanism 32 of the continuously-variable transmission portion 18, the engine 14 (see "ENG" in FIG. 3) is connected to the first rotary element RE1; the first rotating machine MG1 (see "MG1" in FIG. 3) is connected to the second rotary element RE2; the second rotating machine MG2 (see "MG2" in FIG. 3) is connected to the third rotary element RE3 that is to be rotated integrally with the intermediate transmitting member 30; and therefore, the rotation of the engine 14 is transmitted via the intermediate transmitting member 30 to the step-variable transmission portion 20. In the continuously-variable transmission portion 18, the relationship between the rotational speed of the sun gear S0 and the rotational speed of the ring gear R0 is indicated by straight lines L0 and L0R crossing the vertical line Y2.

In the step-variable transmission portion 20, the fourth rotary element RE4 is selectively connected through the clutch C1 to the intermediate transmitting member 30; the fifth rotary element RE5 is connected to the output shaft 22; the sixth rotary element RE6 is selectively connected through the clutch C2 to the intermediate transmitting member 30 and selectively connected through the brake B2 to the casing 16; and the seventh rotary element RE7 is selectively connected through the brake B1 to the casing 16. In the step-variable transmission portion 20, the rotational speeds of the output shaft 22 at the first speed AT gear position "1st", second speed AT gear position "2nd", third speed AT gear position "3rd", fourth speed AT gear position "4th" and reverse AT gear position "Rev" are indicated by respective straight lines L1, L2, L3, L4, LR crossing the vertical line Y5 in accordance with engagement/release control of the engagement devices CB.

The straight line L0 and the straight lines L1, L2, L3, L4 indicated by solid lines in FIG. 3 indicate the relative rotational speeds of the rotary elements during forward running in a hybrid running mode enabling a hybrid running in which at least the engine 14 is used as the drive force source for driving the vehicle 10. In this hybrid running mode, when a reaction torque, i.e., a negative torque from the first rotating machine MG1, is inputted in positive rotation to the sun gear S0 with respect to the engine torque Te inputted to the carrier CA0 in the differential mechanism 32, an engine direct transmission torque $Td[=Te/(1+\rho 0)=-$ $(1/\rho0) \times Tg]$ appears in the ring gear R0 as a positive torque in positive rotation. A combined torque of the engine direct transmission torque Td and the MG2 torque Tm is transmitted as the drive torque of the vehicle 10 in the forward direction depending on a required drive force to the drive wheels 28 through the step-variable transmission portion 20 having any AT gear position formed out of the first through fourth speed AT gear positions ("1st"-"4th"). In this case, the first rotating machine MG1 functions as an electric generator generating a negative torque in positive rotation. A generated electric power Wg of the first rotating machine MG1 is stored in the battery 54 or consumed by the second rotating machine MG2. The second rotating machine MG2 outputs the MG2 torque Tm by using all or a part of the generated electric power Wg or using the electric power from the battery 54 in addition to the generated electric power Wg.

In the differential mechanism 32 during a motor drive mode in which the vehicle 10 is driven with a drive force generated by the second rotating machine MG2 operated as a drive power source while the engine 14 is stopped (held at rest), the carrier CA0 is held stationary while the MG2 torque Tm that is a positive torque is applied to the ring gear R0 and rotating the ring gear R0 in the positive direction. The state of the differential mechanism 32 in this motor drive mode is not shown in the collinear chart of FIG. 3. At this time, the first rotating machine MG1 connected to the sun gear S0 is placed in a non-load state and freely rotatable in the negative direction. Namely, in the motor drive mode, the engine 14 is held in its non-operated state, so that an rotating speed ωe of the engine 14 (engine rotating speed ωe) is kept zero, and the vehicle 10 is driven in the forward direction with the MG2 torque Tm (positive forward drive torque), which is transmitted as a forward drive torque to the drive wheels 28 through the step-variable transmission portion 20 placed in one of the first through fourth speed AT gear positions ("1st"-"4th"). During the forward running in the motor running mode, the MG2 torque Tm is a power running torque that is a positive torque in positive rotation.

The straight lines L0R and LR indicated by broken lines in FIG. 3 indicate the relative rotational speeds of the rotary elements in reverse running in the motor running mode. During reverse running in this motor running mode, the MG2 torque Tm is inputted to the ring gear R0 as a negative torque in negative rotation, and the MG2 torque Tm is transmitted as the drive torque of the vehicle 10 in a reverse direction to the drive wheels 28 through the step-variable transmission portion 20 in which the first speed AT gear position "1st" is established. The vehicle 10 can perform the reverse running when the electronic control apparatus 90 causes the second rotating machine MG2 to output a reverse MG2 torque Tm having a positive/negative sign opposite to a forward MG2 torque Tm during forward running while a forward low-side AT gear position, for example, the first speed AT gear position "1st", is established as one the plurality of AT gear positions. During the reverse running in the motor running mode, the MG2 torque Tm is a power running torque that is a negative torque in negative rotation. In this case, the forward MG2 torque Tm is a power running torque that is a positive torque in positive direction, and the reverse MG2 torque Tm is a power running torque that is a negative torque in negative direction. An intersection "Rev" between the vertical line Y5 and the straight line LR represents the rotational speed of the output shaft 22 during the reverse running. In this way, the vehicle 10 performs the reverse running by inverting positiveness/negativeness of the MG2 torque Tm with the forward AT gear position. Using the forward AT gear position means using the same AT gear position as when the forward running is performed. Even in the hybrid running mode, the reverse running can be performed as in the motor running mode, for example, by placing the first rotating machine MG1 in the non-load state and causing the second rotating machine MG2 to be rotated in negative direction such that the engine rotational speed Ne is kept in an idling rotational speed.

In the drive-force transmitting device 12, the continuously-variable transmission portion 18 constitutes an electric transmission mechanism that includes the differential mechanism 32 having three rotary elements, wherein the three rotary elements consist of the first rotary element RE1 in the form of the carrier CA0 to which the engine 14 is connected in a drive-force transmittable manner, the second rotary element RE2 in the form of the sun gear S0 to which the first rotating machine MG1 is connected in a drive-force transmittable manner, and the third rotary element RE3 in the form of the ring gear R0 to which the intermediate transmitting member 30 is connected, and wherein the differential state of the differential mechanism 32 is controlled by controlling the operation state of the first rotating machine MG1. The continuously-variable transmission portion 18 is operated as an electric continuously variable transmission driven to change a gear ratio $\gamma0$ (=Ne/Nm) that is a ratio of the engine rotational speed Ne to the MG2 rotational speed Nm, wherein the engine rotational speed Ne is equal to the rotational speed of the connecting shaft 34 serving as an input rotary member of the continuously-variable transmission portion 18 while the MG2 rotational speed Nm is equal to the rotational speed of the intermediate transmitting member 30 serving as an output rotating member of the continuously-variable transmission portion 18.

For example, in the hybrid running mode, when the rotational speed of the sun gear S0 is increased or reduced by controlling the rotational speed of the first rotating machine MG1 relative to the rotational speed of the ring gear R0 that is restrained by the rotation of the drive wheels 28 since one of the AT gear positions is established in the step-variable transmission portion 20, the rotational speed of the carrier CA0, i.e., the engine rotational speed Ne, is increased or reduced. Therefore, in the hybrid running, the engine 14 can be operated at an efficient operating point. Thus, a continuously variable transmission can be constituted by cooperation of the step-variable transmission portion 20 having one of the AT gear position is established therein and the continuously-variable transmission portion 18 operated as a continuously variable transmission, as the whole of the transmission device 40 in which the continuously-variable transmission portion 18 and the step-variable transmission portion 20 are arranged in series.

Alternatively, since a shifting operation can be performed in the continuously-variable transmission portion 18 as in a step-variable transmission, a shifting operation can be performed as in a step-variable transmission by using the step-variable transmission portion 20 having one of the AT gear positions established therein and the continuously-variable transmission portion 18 in which a shifting operation is performed as in a step-variable transmission, as the whole of the transmission device 40. In other words, in the transmission device 40, the step-variable transmission portion 20 and the continuously-variable transmission portion 18 can be controlled so as to selectively establish a plurality of gear positions that are different in the gear ratio $\gamma t$ (=Ne/No) indicative of the ratio of the engine rotational speed Ne to the output rotational speed No. In the present embodiment, the gear position established in the transmission device 40 is referred to as an overall speed position (although it may be referred also to as a conceptual speed position). The gear ratio γt is an overall gear ratio of the transmission device 40 consisting of the continuously-variable transmission portion 18 and the step-variable transmission portion 20 which are disposed in series with each other. The overall gear ratio γt is equal to a product of the gear ratio γ0 of the continuously-variable transmission portion 18 and the gear ratio γat of the step-variable transmission portion 20, namely, γt=γ0×γat.

For example, the overall speed position is assigned such that one or more types are established for each of the AT gear positions of the step-variable transmission portion 20 by combining the AT gear positions of the step-variable transmission portion 20 with one or more types of the gear ratio γ0 of the continuously-variable transmission portion 18. For example, the overall speed position is defined in advance such that first through third overall speed positions are established for the first speed AT gear position "1st", the fourth through sixth overall speed positions are established for the second speed AT gear position "2nd", seventh through ninth overall speed positions are established for the third speed AT gear position "3rd", and the tenth overall speed position is established for the fourth speed AT gear position "4th". In the transmission device 40, the continuously-variable transmission portion 18 is controlled to attain the engine rotational speed Ne by which a desired overall gear ratio γt (i.e., one of a plurality of overall gear ratios γt) is established for the output rotational speed No, so that different speed positions are established with a certain AT gear position being established in the step-variable transmission portion 20. Further, in the transmission device 40, the continuously-variable transmission portion 18 is controlled with switching of the AT gear position in the step-variable transmission portion 20 whereby the overall speed position is switched.

Figure 5:
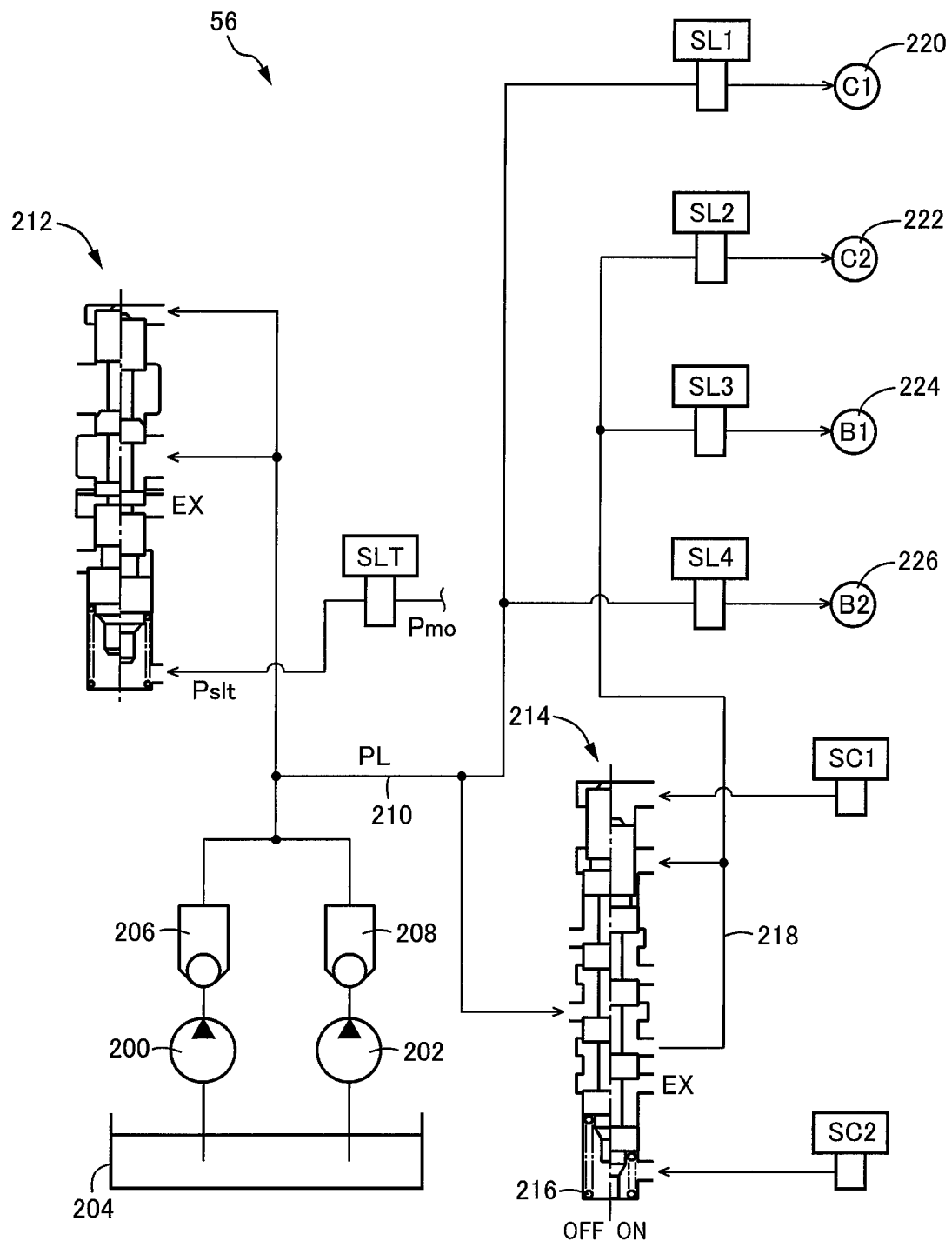
FIG. 5 is a hydraulic circuit diagram for explaining an example of a hydraulic control unit that is involved in the shift control operation in the mechanically-operated step-variable transmission portion shown in FIG. 1.

FIG. 5 is a hydraulic circuit diagram for explaining an example of the hydraulic control unit 56 that includes the linear solenoid valves SL1-SL4 by which the engagement devices CB are controlled to be engaged and released. The hydraulic control unit 56 includes a hydraulic pressure source in the form of a mechanically-operated oil pump 200 that is to be rotated or driven by the engine 14, an electrically-operated oil pump 202 that is to be rotated or driven by an electric motor. The oil pumps 200, 202 are configured to pump a working fluid up from a fluid storage portion 204 such as an oil pan. The working fluid pumped up from the fluid storage portion 204 is supplied to a line-pressure fluid passage 210 through check valves 206, 208, and is regulated to a certain line pressure PL by a line-pressure control valve 212 such as a primary regulator valve. A linear solenoid valve SLT, which is connected to the line-pressure control valve 212, is configured to receive an origin pressure in the form of a modulator pressure Pmo that is substantially constant, and is to be electrically controlled by the electronic control apparatus 90 so as to output a signal pressure Pslt. When the signal pressure Pslt is supplied to the line-pressure control valve 212, a spool of the line-pressure control valve 212 is forced or biased by the signal pressure Pslt so as to be axially moved whereby a drain flow rate is changed, so that the line pressure PL is regulated to a pressure value that is dependent on the signal pressure Pslt. The line pressure PL is regulated to the pressure value that is dependent on, for example, the accelerator opening degree θacc that corresponds to a required output amount.

The working fluid regulated to the line pressure PL is supplied directly to the linear solenoid valves SL1, SL4 from the line-pressure fluid passage 210. Further, a part of the working fluid in the line-pressure fluid passage 210 is supplied to the linear solenoid valves SL2, SL3 through a range switch valve 214 and a D-range fluid passage. The linear solenoid valves SL1-SL4 are provided for respective hydraulic actuators (hydraulic cylinders) 220, 222, 224, 226 of the clutches C1, C2 and brakes B1, B2, and are configured to output respective output pressures Pout (engaging hydraulic pressures Pcb) that are controlled in accordance with a hydraulic control command signal Sat supplied from the electronic control apparatus 90, such that the clutches C1, C2 and the brakes B1, B2 are controlled to be engaged or released independently of each other whereby one of the four forward AT gear positions consisting of the first through fourth speed AT gear positions ("1st"-"4th") is established.

The spool of the range switch valve 214 is constantly forced or biased by a spring 216 in one of axially opposite directions, i.e., an upward direction as seen in FIG. 5, whereby the spool is held in its OFF position (i.e., position indicated on left side of its axis) that blocks flow of the working fluid from the line-pressure fluid passage 210 to the D-range fluid passage 218. To the range switch valve 214, a switching fluid is supplied from each of the first and second solenoid valves SC1, SC2 that are controlled to be opened and closed by the electronic control apparatus 90. When the switching fluid is supplied to the range switch valve 214 from the first solenoid valve SC1 with supply of the switching fluid from the second solenoid valve SC2 being stopped, the spool is moved against biasing force of the spring 216 so as to be positioned in its ON position (i.e., position indicated on right side of its axis), whereby the working fluid of the line pressure PL is allowed to flow from the line-pressure fluid passage 210 to the D-range fluid passage 218. When the switching fluid is supplied from both of the first and second solenoid valves SC1, SC2, and when the supply of the switching fluid from both of the first and second solenoid valves SC1, SC2 is stopped, the spool is held in the OFF position whereby the flow of the working fluid from the line-pressure fluid passage 210 to the D-range fluid passage 218 is blocked. Each of the first and second solenoid valves SC1, SC2 is a normally closed valve that is configured to output the switching fluid when being energized.

The first and second solenoid valves SC1, SC2 are controlled in accordance with a range selected by a shift lever, for example, as shown in FIG. 2. In columns of "SC1" and "SC2" in FIG. 2, "O" indicates that the corresponding solenoid valve is energized to output the switching fluid, and the blank indicates that the corresponding solenoid valve is de-energized to not output the switching fluid. As shown in FIG. 2, the first solenoid valve SC1 is always held in ON state (energized) to output the switching fluid, irrespective of kind of the selected range. On the other hand, the second solenoid valve SC2 is placed in ON state (energized) to output the switching fluid when P range for parking or R range for reverse running is selected, and is placed in OFF state (de-energized) to not output the switching fluid when D range for forward running is selected. Therefore, when the P range for parking is selected and when the R range for reverse running is selected, the spool of the range switch valve 214 is placed in the OFF position so as to block the flow of the working fluid from the line-pressure fluid passage 210 to the D-range fluid passage 218, so that the step-variable transmission portion 20 can establish only the first speed AT gear position "1st". When the D range for forward running is selected, the spool of the range switch valve 214 is placed in the ON position so as to allow the flow of the working fluid from the line-pressure fluid passage 210 to the D-range fluid passage 218, so that the step-variable transmission portion 20 can establish any one of the first through fourth speed AT gear positions ("1st"-"4th"). It is noted that, when N range for cutting off transmission of the drive force is selected, the second solenoid valve SC2 is placed in OFF state (de-energized) during forward running, and is placed in ON state (energized) during reverse running. In the present embodiment, when the P range is selected and when the N range is selected, the first speed AT gear position "1st" is established in the step-variable transmission portion 20, and transmission of the drive force is cut off with torques of the first and second rotating machines MG1, MG2 being both zeroed. When the P range is selected and when the N range is selected, the step-variable transmission portion 20 can be placed in a drive-force transmission cutting-off state, by releasing all of the engagement devices CB.

Figure 6:
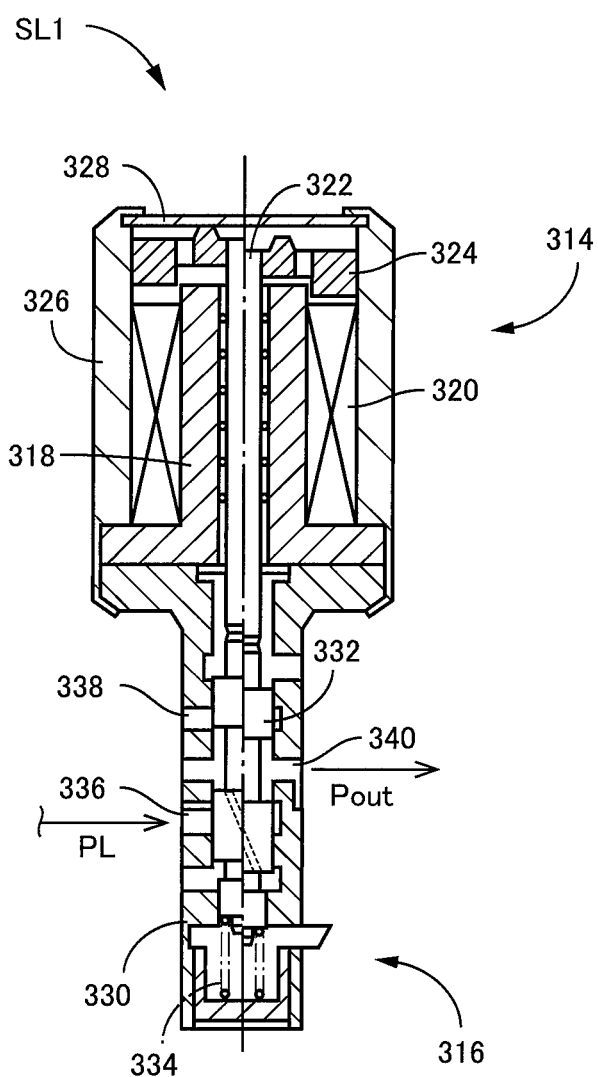
FIG. 6 is a cross sectional view for explaining a specific construction of a linear solenoid valve SL1 shown in FIG. 5.
Figure 7:
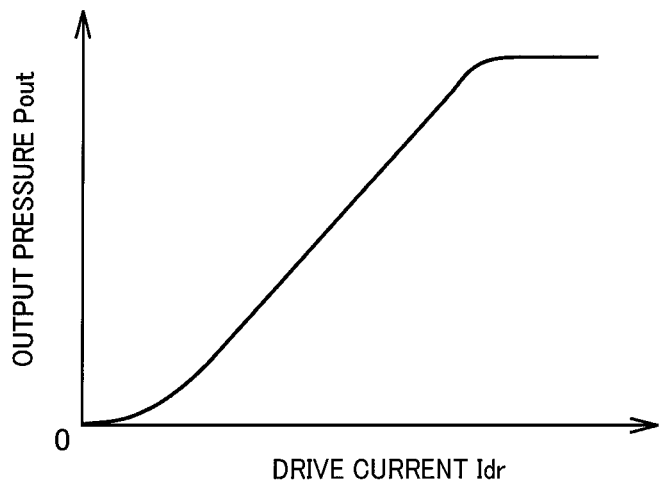
FIG. 7 is a view showing, by way of example, an output-pressure characteristic of each of the linear solenoid valves SL1-SL4.

FIG. 6 is a cross sectional view for explaining a construction of each of the solenoid valves SL1-SL4. FIG. 6 shows, by way of example, the solenoid valve SL1 as one of the solenoid valves SL1-SL4 that are substantially identical in construction with one another. The solenoid valve SL1 includes a solenoid portion 314 configured, when being energized, to covert an electric energy into a drive force, and a regulator portion 316 configured, when being driven by the solenoid portion 314, to regulate the line pressure PL as an input pressure so as to generate a certain output pressure Pout (corresponding to the engaging hydraulic pressure Pcb). The solenoid portion 314 includes a cylindrical-tubular-shaped winding core 318, a coil 320 constituted by a conductor cable wound on a periphery of the winding core 318, a core 322 provided to be axially movable inside the winding core 318, a plunger 324 fixed to one of axially opposite end portions of the core 322 which is remote from the regulator portion 316, a casing 326 storing therein the winding core 318, coil 320, core 322 and plunger 324, and a cover 328 fitted in an opening of the casing 326. The regulator portion 316 includes a sleeve 330 fitted in the casing 326, a spool 332 provided to be axially movable inside the sleeve 330, and a spring 334 constantly forces or biases the spool 332 toward the solenoid portion 314. The spool 332 is in contact, at one of axially opposite end portions which is on a side of the solenoid portion 314, with the other of the above-described axially opposite end portions of the core 322, namely, one of the above-described axially opposite end portions of the core 322, which is on a side of the regulator portion 316. In the solenoid valve SL1 constructed as described above, with a drive current Idr being applied to the coil 320, the plunger 324 is moved by a distance that is dependent on an amount of the applied electric current, in an axial direction of the plunger 324, core 322 and spool 332 that are coaxial with one another, and the core 322 and the spool 332 are moved together with the plunger 324 in the same axial direction. With the axial movement of the spool 332, a rate of flow of the working fluid introduced through an inlet port 336 and a rate of flow of the working fluid discharged through a drain port 338 are adjusted, so that the line pressure PL inputted through the inlet port 336 is regulated to an output pressure Pout corresponding to the drive current Idr, in accordance with the valve characteristic, which is a relationship, as shown in FIG. 7 by way of example, between the drive current Idr and the output pressure Pout. The output pressure Pout is outputted through an outlet port 340. In columns of "SL1"-"SL4" in FIG. 2, "O" indicates that the corresponding solenoid valve is energized by the drive current Idr to output the output pressure Pout for thereby engaging the corresponding engagement device CB, the blank indicates that the corresponding solenoid valve is de-energized to not output the switching fluid for thereby releasing the corresponding engagement device CB, and "Δ" indicates that the corresponding solenoid valve is energized during application of the engine brake or during the coasting shift-down action of the step-variable transmission portion 20.

Figure 8:
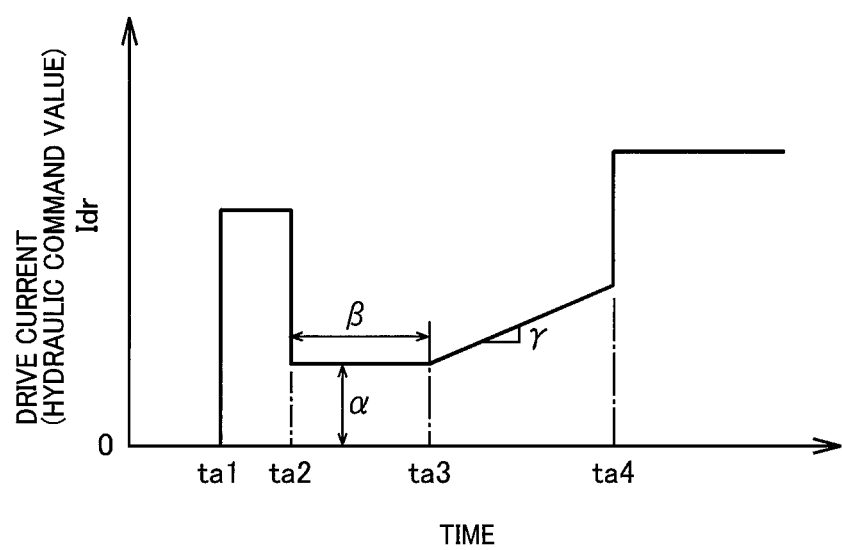
FIG. 8 is a view for explaining an example of a control pattern in execution of a shifting action in the mechanically-operated step-variable transmission portion shown in FIG. 1 in which a hydraulic command value applied to an engaging-side frictional engagement device is controlled in accordance with the control pattern.

FIG. 8 shows, by way of example, a control pattern of the drive current Idr that corresponds to the hydraulic command value of an engaging-side one of the engagement devices CB which is to be engaged when the "clutch-to-clutch" shifting operation is executed in the step-variable transmission portion 20. For example, in execution of the shift-up action from 2nd to 3rd, as is apparent from FIG. 2, the brake B1 and the clutch C2 are controlled to be released and engaged, respectively. The above-described one of the engaging-side one of the engagement devices CB is the clutch C2 that is to be engaged. In the control pattern shown in FIG. 8, when a shifting command is outputted at a time point ta1, the drive current Idr is quickly increased for quickly filling with the working fluid, namely, quickly applying the drive current. A time period from the time point ta1 to a time point ta2 corresponds to a quick filling (quick applying) period. At the time point ta2, the drive current Idr is reduced to an electric current value corresponding to a predetermined engagement stand-by pressure α by which the clutch C2 is held in its engagement stand-by state. The drive current Idr is kept at the electric current value corresponding to the engagement stand-by pressure α for a predetermined stand-by time β. Then, at a time point ta3, the drive current Idr is gradually increased such that a C2 hydraulic pressure Pc2 is increased at a predetermined change rate γ for causing the clutch C2 to be gradually engaged. In process of increase of the C2 hydraulic pressure Pc2, the AT input rotational speed Ni (=Nm) is changed. When the AT input rotational speed Ni reaches a synchronized rotational speed in a post-shift stage in which the third speed AT gear position "3rd" is established, at a time point ta4, the drive current Idr, i.e., C2 hydraulic pressure Pc2, is increased to a maximum value whereby the clutch C2 is fully engaged.

Referring back to FIG. 1, the vehicle 10 is provided with the electronic control apparatus 90 as a controller configured to execute various control operations such as an output control operation for the engine 14, a shift control operation for the continuously-variable transmission portion 18 and a shift control operation for the step-variable transmission portion 20. FIG. 1 is a view showing also an input/output system of the electronic control apparatus 90, and is a functional block diagram for explaining major control functions and control portions of the electronic control apparatus 90. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 may be constituted by two or more control units exclusively assigned to perform different control operations such as the engine control operation and the shift control operations, as needed.

The electronic control apparatus 90 receives various input signals based on values detected by respective sensors provided in the vehicle 10. Specifically, the electronic control apparatus 90 receives: an output signal of an engine speed sensor 60 indicative of the engine rotational speed Ne which is the rotational speed of the engine 14; an output signal of an output speed sensor 62 indicative of the output-shaft rotational speed No which is the rotational speed of the output shaft 22 and which corresponds to the running speed V of the vehicle 10; an output signal of a MG1 speed sensor 64 indicative of an MG1 rotational speed Ng which is the rotational speed of the first rotating machine MG1; an output signal of a MG2 speed sensor 66 indicative of the MG2 rotational speed Nm which is the rotational speed of the second rotating machine MG2 and which corresponds to the AT input rotational speed Ni; an output signal of an accelerator-opening degree sensor 68 indicative of the accelerator opening degree θacc representing an amount of accelerating operation made by the vehicle driver; an output signal of a throttle-opening degree sensor 70 indicative of a throttle opening degree θth; an output signal of a brake pedal sensor 71 indicative of a brake-ON signal Bon representing a state of depression of a brake pedal by the vehicle driver to operate wheel brakes (service brake) and also a braking operation amount Bra representing an amount of depression of the brake pedal by the vehicle driver corresponding to a depressing force applied to the brake pedal; an output signal of a steering sensor 72 indicative of a steering angle θsw and a steering direction Dsw of a steering wheel provided in the vehicle 10 and also a steering ON signal SWon representing a state in which the steering wheel is being held by the vehicle driver; an output signal of a driver condition sensor 73 indicative of a driver condition signal Dry representing a condition of the vehicle driver; an output signal of a G sensor 74 indicative of a longitudinal acceleration Gx and a lateral acceleration Gy of the vehicle 10; an output signal of a yaw rate sensor 76 indicative of a yaw rate Ryaw that is an angular speed around a vertical axis of the vehicle 10; an output signal of a battery sensor 78 indicative of a battery temperature THba, a charging/discharging electric current that and a voltage Vbat of the battery 54; an output signal of a fluid temperature sensor 79 indicative of a working fluid temperature THoil that is a temperature of the working fluid supplied to the hydraulic actuators of the engagement devices CB; an output signal of a vehicle-area information sensor 80 indicative of vehicle area information Iard that is detected by, for example, a camera and a distance sensor; an output signal of a GPS (Global Positioning System) antenna 81 indicative of GPS signal Sgps; an output signal of an external-network communication antenna 82 indicative of an communication signal Scom; an output signal of a navigation system 83 indicative of navigation information Inavi; output signals of drive-assist setting switches 84 indicative of drive-assist setting signals Sset representing a setting made by the vehicle driver for execution of a drive-assist control such as automatic drive control and an auto-cruise control; and an output signal of a shift position sensor 85 indicative of an operation position POSsh of a shift lever provided in the vehicle 10.

The driver condition sensor 73 includes a camera configured to photograph, for example, a facial expression and pupils of eyes of the vehicle driver and/or a biometric information sensor configured to detect biometric information of the vehicle driver, so as to detect or obtain directions of his or her eyes and face, movements of his or her eye balls and face and condition of his or her heartbeat, for example.

The vehicle-area information sensor 80 includes a lidar (Light Detection and Ranging), a radar (Radio Detection and Ranging) and/or an onboard camera, for example, so as to directly obtain information relating to a road on which the vehicle 10 is running and information relating to an object or objects present around the vehicle 10. The lidar is constituted by, for example, a plurality of lidar units configured to detect objects present in the respective front, lateral and rear sides of the vehicle 10, or a single lidar unit configured to detect objects present all around the vehicle 10. The lidar is configured to output, as the vehicle area information Iard, object information that is information relating to the detected object or objects. The radar is constituted by, for example, a plurality of radar units configured to detect objects present in the respective front, front vicinity and rear vicinity of the vehicle 10, and to output, as the vehicle area information Iard, object information that is information relating to the detected object or objects. The object information outputted as the vehicle area information Iard by the lidar and the radar includes a distance and a direction of each of the detected objects from the vehicle 10. The onboard camera is, for example, a monocular camera or a stereo camera which is provided on a rear side of a front window of the vehicle 10 and is configured to capture an image front side of the vehicle 10, and to output, as the vehicle area information Iard, captured image information that is information relating to the captured image. The captured image information outputted as the vehicle area information Iard by the onboard camera includes information relating to lanes of a running road, signs and parking spaces present on the running road, and other vehicles, pedestrians and obstacles present on the running road.

The drive-assist setting switches 84 include an automatic-drive selecting switch for executing the automatic drive control, a cruise switch for executing the cruise control, a switch for setting the vehicle running speed in execution of the cruise control, a switch for setting a distance from another vehicle preceding the vehicle 10 in execution of the cruise control, and a switch for executing a lane keeping control for keeping the vehicle 10 to run within a selected road lane.

The communication signal Scom includes road traffic information that is transmitted and received to and from a center that is an external device such as a server and a road traffic information communication system, and/or inter-vehicle communication information that is directly transmitted and received to and from the other vehicles present in the vicinity of the vehicle 10 without via the center. The road traffic information includes information relating to traffic jams, accidents, road constructions, required travel times, and parking lots on roads. The inter-vehicle communication information includes vehicle information, running information, traffic environment information. The vehicle information includes information indicative of a vehicle type of each of the other vehicles such as passenger vehicle, truck, and two-wheel vehicle. The running information includes information relating to the other vehicles such as information indicative of the vehicle speed V, location information, brake-pedal operation information, turn-signal-lamp blinking information, and hazard-lamp blinking information. The traffic environment information includes information relating to traffic jams and road constructions.

The navigation information Inavi includes map information such as road information and facility information that are based on the map data pre-stored in the navigation system 83. The road information includes information relating to types of roads (such as urban roads, suburban roads, mountain roads and highway road), branching and merging of roads, road gradients, and running speed limits. The facility information includes information of types, locations, names of sites such as supermarkets, shops, restaurants, parking lots, parks, places for repairing the vehicle 10, a home of vehicle's owner and service areas located on the highway road. The service areas are sites which are located on, for example, the highway road, and in which there are facilities for parking, eating, and refueling.

The navigation system 83 is configured to specify a location of the vehicle 10 on pre-stored map data, based on the GPS signal Sgps, and to indicate the location of the vehicle 10 on the map displayed on a display device 89. The navigation system 83 receives a destination point inputted thereto, calculates a running route from a departure point to the destination point, and informs, as instructions, the vehicle driver of the running route, for example, through the display device 89 and a speaker. The display device 89 is constituted by, for example, a multi-display device which is configured to receive a touch operation, and which is to be used for various purposes other than for the navigation system 83, such that maintenance information relating to inspection of the vehicle 10 also can be displayed in the display device 89, for example. Further, the display device 89 may be configured not only to display information, but also to provide information by emitting sounds such as voice and music sound.

The shift position sensor 85 is configured to detect the operation position POSsh (shift position) of the shift lever. The shift lever is provided to select one of the D range for the forward running, the R range for the reverse running, the P range for the parking and the N range for cutting off the transmission of the drive force, and is to be operated to be placed in one of a D position for selecting the D range, an R position for selecting the R range, a P position for selecting the P range and an N position for selecting the N range. The drive-force transmitting device 12 establishes a drive-force transmitting state, which is changed depending on the selected range, such that the vehicle 10 is enabled to run in forward direction when the D range is selected, and to run in reverse direction when the R range is selected, and such that the transmission of the drive force is inhibited when the P range or N range is selected.

The electronic control apparatus 90 generates various output signals to the various devices provided in the vehicle 10, such as: an engine control command signal Se that is to be supplied to the engine control device 50 for controlling the engine 14, rotating-machine control command signals Smg that are to be supplied to the inverter 52 for controlling the first and second rotating machines MG1, MG2; a hydraulic control command signal Sat that is to be supplied to the hydraulic control unit 56 for controlling the operation states of the engagement devices CB; the communication signal Scom that is to be supplied to the external-network communication antenna 82; a brake-control command signal Sbra that is supplied to a wheel brake device 86, for controlling a braking torque generated by the wheel brake device 86; a steering-control command signal Sste that is to be supplied to a steering device 87, for controlling steering of wheels (especially, front wheels) of the vehicle 10; and an information-notification-control command signal Sinf that is to be supplied to an information notification device 88, for warning and notifying information to the vehicle driver.

The wheel brake device 86 is a brake device including wheel brakes each of which is configured to apply a braking torque to a corresponding one of the wheels that include the drive wheels 28 and driven wheels (not shown). The wheel brake device 86 supplies a brake hydraulic pressure to a wheel cylinder provided in each of the wheel brakes in response to a depressing operation of the brake pedal by the vehicle driver, for example. In the wheel brake device 86, normally, a brake master cylinder is configured to generate a master-cylinder hydraulic pressure whose magnitude corresponds to the depressing force applied to the brake pedal, and the generated master-cylinder hydraulic pressure is supplied as the brake hydraulic pressure to the wheel cylinder. On the other hand, in the wheel brake device 86, for example, during execution of an ABS control, an anti-skid control, a vehicle-running-speed control or an automatic drive control, the brake hydraulic pressure required for execution of such a control is supplied to the wheel cylinder for enabling the wheel cylinder to generate the required braking torque.

The steering device 87 is configured to apply an assist torque to a steering system of the vehicle 10 in accordance with the vehicle running speed V, steering angle θsw, steering direction Dsw and yaw rate Ryaw, for example. For example, during execution of the automatic drive control, the steering device 87 applies a torque for controlling the steering of the front wheels, to the steering system of the vehicle 10.

The information notification device 88 is configured to give a warning or notification to the vehicle driver in even of a failure in some components involved in the running of the vehicle 10 or deterioration in the functions of the components, for example. The information notification device 88 is constituted by, for example, a display device such as a monitor, a display and an alarm lamp, and/or a sound output device such as a speaker and a buzzer. The display device may be constituted by the above-described display device 89, and is configured to visually give a warning or notification to the vehicle driver. The sound output device is configured to aurally give a warning or notification to the vehicle driver.

For performing various control operations in the vehicle 10, the electronic control apparatus 90 includes a driving control means or portion in the form of a driving control portion 94, an AT shift control means or portion in the form of an AT shift control portion 96, and a hybrid control means or portion in the form of a hybrid control portion 98.

The driving control portion 94 is capable of executing, as a drive control for driving the vehicle 10, a selected one of (i) an autonomous drive control for driving the vehicle 10 in accordance with driving operations made by the vehicle driver and (ii) an automatic drive control for driving the vehicle 10 by executing the drive control without depending on the driving operations made by the vehicle driver, by automatically determining a target driving state based on, for example, the map information and the destination point inputted by the vehicle driver, and accelerating, decelerating and steering the vehicle 10 depending on the determined target driving state. The autonomous drive control is for causing the vehicle 10 to run by an autonomous drive based on the driving operations made by the vehicle driver, and is a manual drive control is for causing the vehicle 10 to run by a manual drive based on the driving operation made by the vehicle driver. The autonomous drive is a driving method for causing the vehicle 10 to run in an ordinary manner by the vehicle driver's driving operations such as an accelerating operation, a barking operation and a steering operation. The automatic drive control is for causing the vehicle 10 to run by an automatic drive, which is a driving method for causing the vehicle 10 to run, for example, by automatically accelerating, decelerating, braking and steering the vehicle 10, by controls executed by the electronic control apparatus 90, based on the signals and information supplied from the various sensors, without depending on the driving operations made by the vehicle driver, namely, without depending on intentions of the vehicle driver.

When an automatic drive mode is not selected with the automatic-drive selecting switch of the drive-assist setting switches 84 being placed in OFF, the driving control portion 94 establishes an autonomous drive mode so as to execute the autonomous. The driving control portion 94 executes the autonomous drive control by outputting commands for controlling the step-variable transmission portion 20, engine 14 and first and second rotating machines MG1, MG2, wherein the commands are supplied to the AT shift control portion 96 and the hybrid control portion 98.

When the automatic drive mode is selected with the automatic-drive selecting switch of the drive-assist setting switches 84 being placed in ON by the vehicle driver, the driving control portion 94 establishes the automatic drive mode so as to execute the automatic drive control. Specifically, the driving control portion 94 automatically sets a target driving state that is dependent on, for example, various settings (such as the destination point, a degree of priority of fuel economy, a vehicle running speed and a distance from another vehicle preceding the vehicle 10) inputted by the vehicle driver, own-vehicle location information based on the GPS signal Sgps, information based on the navigation information Inavi and/or the communication signal Scom, and information based on the vehicle area information Iard, wherein the information based on the navigation information Inavi and/or the communication signal Scom includes the map information such as a running road condition (e.g., curve, slope, altitude, legal speed limit), infrastructure information and weather information, and wherein the information based on the vehicle area information Iard includes information relating to lanes of a running road, signs present on the running road, and other vehicles and pedestrians present on the running road. The driving control portion 94 executes the automatic drive control by automatically accelerating, decelerating and steering the vehicle 10, based on the set target driving state, wherein the decelerating may include braking the vehicle 10.

The driving control portion 94 determines, as the above-described target driving state, a target route, a target course, a target running speed, a target drive torque and/or a target acceleration/deceleration, wherein the target running speed is to be determined by taking account of a safety margin based on an actual distance to the preceding vehicle, and wherein each of the target drive torque and the target acceleration/deceleration is to be determined depending on the target running speed and a running resistance. The running resistance may be, for example, a value set in advance by the driver for the vehicle 10, a value based on the map information obtained through communication with the external device and/or vehicle specifications, or an estimated value calculated based on, for example, a gradient of a road, an actual drive amount, an actual longitudinal acceleration Gx during running. The driving control portion 94 outputs commands to the AT shift control portion 96 and the hybrid control portion 98 for respectively controlling the step-variable transmission portion 20, the engine 14, and the rotating machines MG1, MG2 so as to obtain the target drive torque. When the target drive torque is a negative torque value, namely, when a braking torque needs to be generated, an engine braking torque generated by the engine 14, a regenerative braking torque generated by the second rotating machine MG2 and/or a wheel braking torque generated by the wheel brake device 86 is applied to the vehicle 10. For example, the driving control portion 94 calculates, as the wheel braking torque, a braking torque value that is an available torque value, and then outputs the brake-control command signal Sbra to the wheel brake device 86, so as to cause the wheel brake device 86 to generate the calculated braking torque value as the wheel braking torque, for thereby obtaining the target drive torque. In addition, the driving control portion 94 outputs the steering-control command signal Sste to the steering device 87, for thereby controlling steering of the front wheels based on the set target driving state.

Figure 4:
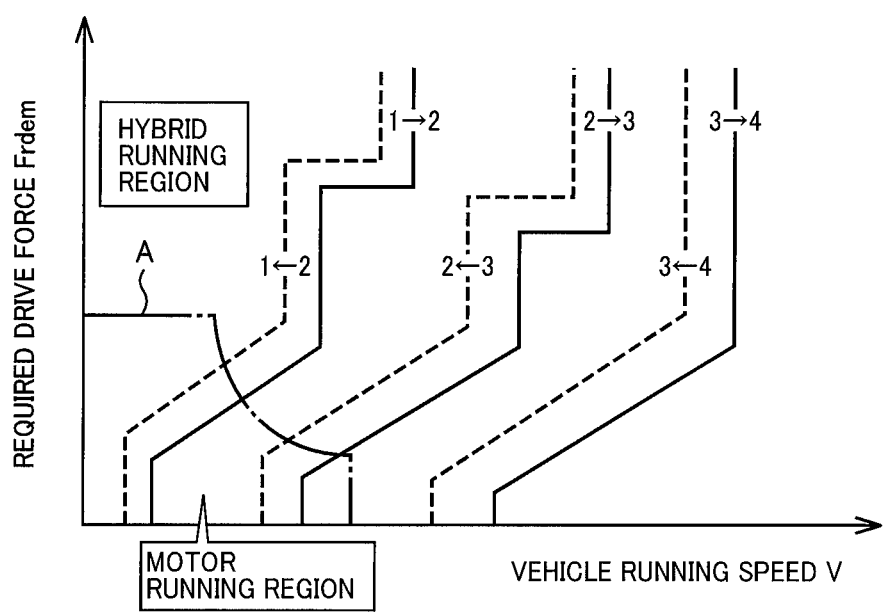
FIG. 4 is a view showing, by way of examples, a shifting map used for executing a shift control operation in the mechanically-operated step-variable transmission portion, and a drive-force-source switching map used for switching between a hybrid running and a motor running.

The AT shift control portion 96 executes the shift control operation in the step-variable transmission portion 20 in accordance with a predetermined shift control program, wherein the shift control operation includes a hydraulic control operation executed for the engagement devices CB involved in the shift control operation in the step-variable transmission portion 20 as the automatic transmission. Specifically, the AT shift control portion 96 determines a shifting action of the step-variable transmission portion 20, by using, for example, an AT-gear-position shift map as shown in FIG. 4, which is a relationship obtained through experimentation or determined by an appropriate design theory, and executes the shift control operation in the step-variable transmission portion 20 as needed. The AT shift control portion 96 outputs the hydraulic control command signal Sat to the hydraulic control unit 56, for switching the operation states of the engagement devices CB by operations of the solenoid valves SL1-SL4, such that the AT gear position of the step-variable transmission portion 20 is automatically switched. The AT gear position shifting map is a predetermined relationship between two variables in the form of the vehicle running speed V and the required drive force Frdem, for example, which relationship is used to determine a shifting action of the step-variable transmission portion 20 and is represented by shifting lines in two-dimensional coordinates in which the running speed V and the required drive force Frdem are taken along respective two axes. It is noted that one of the two variables may be the output rotational speed No in place of the vehicle running speed V and that the other of the two variables may be the required drive torque Trdem, accelerator opening degree θacc or throttle valve opening degree θth in place of the required drive force Frdem. The shifting lines in the AT gear position shifting map consist of shift-up lines (indicated by solid lines in FIG. 4) for determining a shift-up action of the step-variable transmission portion 20, and shift-down lines (indicated by broken lines in FIG. 4) for determining a shift-down action of the step-variable transmission portion 20. In execution of the automatic drive control, the target drive force and target drive torque may be used as the required drive force Frdem and required drive torque Trdem, respectively.

Figure 9:
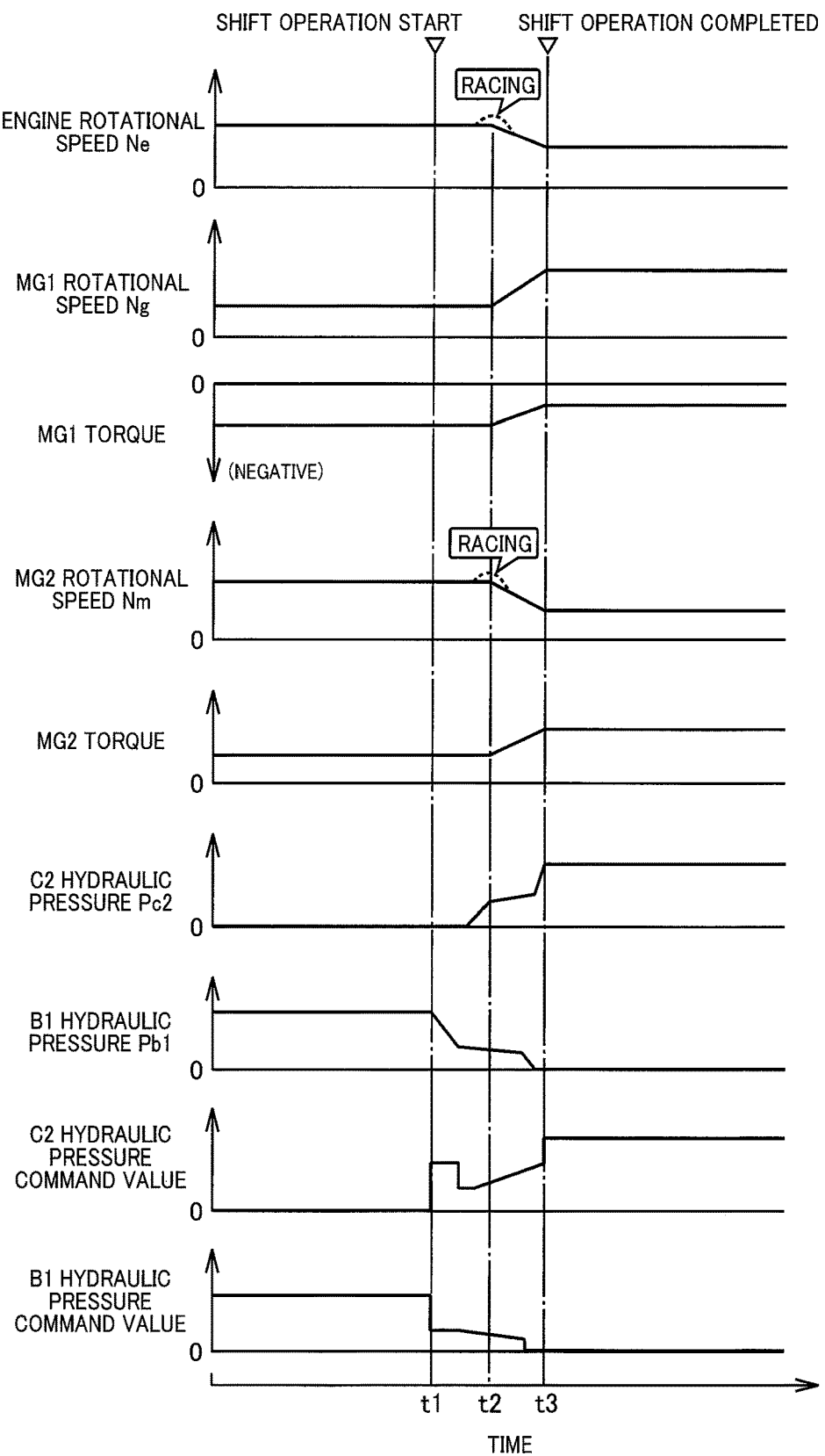
FIG. 9 is a time chart for explaining changes of respective parts when a shift-up action from a second speed AT gear position to a third speed AT gear position is executed in the mechanically-operated step-variable transmission portion shown in FIG. 1.

FIG. 9 is a time chart for explaining changes of respective parts when a shifting action is executed in the step-variable transmission portion 20 by the AT shift control portion 96. Specifically, the time chart shows a case of execution of the shift-up action from 2nd to 3rd in which the brake B1 is released while the clutch C2 is engaged. In FIG. 9, a time point t1 is a point of time at which the shift control operation is started in accordance with the shifting command. From the time point t1, a C2 hydraulic command value (specifically, the drive current Idr applied to the linear solenoid valve SL2) is changed in accordance with the predetermined control pattern as shown in FIG. 8, and a B1 hydraulic command value (specifically, the drive current Idr applied to the linear solenoid valve SL3) is changed in accordance with a predetermined control pattern. A time point t2 is a point of time at which an inertia phase starts, so that the MG2 rotational speed Nm (that is the AT input rotational speed Ni) starts to be reduced at the time point t2 with changes of the engaging torques of the brake B1 and the clutch C2. A time point t3 is a point of time at which the MG2 rotational speed Nm has been reduced to its synchronized rotational speed in the post-shift stage in which the third speed AT gear position "3rd" is established, so that the inertia phase ends, namely, the shifting action is completed at the time point t3.

The hybrid control portion 98 has a function serving as an engine control means or portion for controlling the operation of the engine 14 and a function serving as a rotating machine control means or portion for controlling the operations of the first rotating machine MG1 and the second rotating machine MG2 via the inverter 52, and executes a hybrid drive control, for example, using the engine 14, the first rotating machine MG1 and the second rotating machine MG2 through these control functions. The hybrid control portion 98 calculates a drive request amount in the form of the required drive force Frdem that is to be applied to the drive wheels 28, by applying the accelerator opening degree θacc and the vehicle running speed V to, for example, a drive request amount map that is a predetermined relationship. The required drive torque Trdem [Nm] applied to the drive wheels 28, a required drive power Prdem [W] applied to the drive wheels 28, a required AT output torque applied to the output shaft 22, etc. may be used as the drive request amount, in addition to the required drive force Frdem [N]. In execution of the automatic drive control, the target drive force and target drive torque may be used as the required drive force Frdem and required drive torque Trdem, respectively.

The hybrid control portion 98 outputs the engine control command signal Se for controlling the engine 14 and the rotating-machine control command signals Smg for controlling the first and second rotating machines MG1, MG2, such that the required drive power Prdem is obtained. The engine control command signal Se is, for example, a command value of an engine power Pe that is the power of the engine 14 outputting the engine torque Te at the current engine rotation speed Ne. The rotating-machine control command signal Smg is, for example, a command value of the generated electric power Wg of the first rotating machine MG1 outputting the MG1 torque Tg as the reaction torque of the engine torque Te at the MG1 rotation speed Ng which is the MG1 rotation speed Ng at the time of command signal Smg output, and is a command value of a consumed electric power Wm of the second rotating machine MG2 outputting the MG2 torque Tm at the MG2 rotation speed Nm which is the MG2 rotation speed Nm at the time of command signal Smg output.

For example, when the transmission device 40 is operated as a continuously variable transmission as a whole by operating the continuously variable transmission portion 18 as a continuously variable transmission, the hybrid control portion 98 controls the engine 14 and controls the generated electric power Wg of the first rotating machine MG1 so as to attain the engine rotational speed Ne and the engine torque Te at which the engine power Pe achieving the required drive power Prdem is acquired in consideration of an engine optimum fuel consumption point etc., and thereby provides the continuously variable shift control of the continuously variable transmission portion 18 to change the gear ratio γ0 of the continuously variable transmission portion 18. As a result of this control, the gear ratio γt of the transmission device 40 is controlled in the case of operating the transmission device 40 as a continuously variable transmission.

For example, when the transmission device 40 is operated as a step-variable transmission as a whole by operating the continuously variable transmission portion 18 as in a step-variable transmission, the hybrid control portion 98 uses a predetermined relationship, for example, an overall speed position shift map, to determine a shifting action of the transmission device 40 and provides the shift control of the continuously variable transmission portion 18 so as to selectively establish the plurality of overall speed positions in coordination with the shift control of the AT gear position of the step-variable transmission portion 20 by the AT shift control portion 96. The plurality of overall speed positions can be established by controlling the engine rotational speed Ne by the first rotating machine MG1 in accordance with the vehicle speed V so as to maintain the respective gear ratios γt. The gear ratio γt of each of the overall speed positions may not necessarily be a constant value over the entire region of the vehicle speed V and may be changed in a predetermined region or may be limited by an upper limit, a lower limit, etc. of the rotational speed of each rotary member or element. As described above, the hybrid control portion 98 can provide the shift control in which the engine rotational speed Ne is changed as in a step-variable shift. An overall step-variable shift control of causing the transmission device 40 to perform a shift as in a step-variable transmission as a whole may be provided only in priority to the continuously variable shift control of operating the transmission device 40 as a continuously variable transmission as a whole in the case that, for example, the vehicle driver selects a running mode placing emphasis on running performance such as a sports running mode etc. or the required drive torque Trdem is relatively large; however, the overall step-variable shift control may basically be provided except when a predetermined restriction is placed on provision.

The hybrid control portion 98 selectively establishes the motor running mode or the hybrid running mode as the running mode depending on a driving state, so as to cause the vehicle 10 to run in a selected one of the running modes. For example, the hybrid control portion 98 establishes the motor running mode when the required drive power Prdem is in a motor running region smaller than a predetermined threshold value, and establishes the hybrid running mode when the required drive power Prdem is in a hybrid running region equal to or greater than the predetermined threshold value. In FIG. 4, one-dot chain line A is a boundary line for switching the drive force source for driving the vehicle 10 between at least the engine 14 and only the second rotating machine MG2. That is, the one-dot chain line A of FIG. 4 is a boundary line between the hybrid running region and the motor running region for switching between the hybrid running and the motor running. A predetermined relationship having the boundary line as indicated by the one-dot chain line A of FIG. 4 is an example of a drive-force source switching map defined by the two-dimensional coordinates of variables in the form of the vehicle running speed V and the required drive force Frdem. It is noted that, in FIG. 4, the drive-force source switching map is shown together with AT gear position shift map, for convenience of the description. In execution of the automatic drive control, too, the similar drive-force source switching map may be used for switching between the motor running mode and the hybrid running mode.

The electronic control apparatus 90 further includes a shift learning portion 100 configured, when a shift control operation is to be executed in the step-variable transmission portion 20 by the AT shift control portion 96, to execute a learning control operation for learning control parameters relating to engaging hydraulic pressures Pcb of the engagement devices CB that are involved in the shift control operation. That is, a shifting trouble such as a shifting shock could be caused by error components of engaging torques of the engagement devices CB that constantly take place, for example, due to individual differences (e.g., characteristic variations) and time-course changes of the linear solenoid valves SL1-SL4 and the engagement devices CB involved in the shift control operation of the step-variable transmission portion 20, wherein the error components of engaging torques of the engagement devices CB are likely to cause, for example, a racing and a tie-up during a shifting action and to increase a length of time required to complete the shifting action. The learning control operation is executed for learning the control parameters relating to the engaging hydraulic pressures Pcb of the engagement devices CB, for thereby compensating the error components, such that the shifting action is performed in a desired target state. The shift learning portion 100 corresponds to "learning control portion" recited in the appended claims.

When the shift control operation has been executed in the step-variable transmission portion 20 by the AT shift control portion 96, the shift learning portion 16 executes the learning control operation based on actual results of the shift control operation. In the present embodiment, the learning control operation is executed for the engagement stand-by pressure α (see FIG. 8) as one of the control parameters relating to the engaging hydraulic pressure Pc2 of the clutch C2 in execution of the shift-up action from 2nd to 3rd. The clutch C2 is one of the frictional engagement devices that is to be engaged in the execution of the shift-up action from 2nd to 3rd in which the clutch C2 is to be engaged while the brake B1 is to be released. Specifically, the learning control operation is executed to increase or reduce a learning value LRN that is a correction or compensation amount by which a reference value (initial value) of the engagement stand-by pressure α is to be increased or reduced such that a racing amount (see broken lines in FIG. 9) is held in within a predetermined target range. The racing amount is an amount of racing that corresponds to an amount of increase of the MG2 rotational speed Nm (that is the AT input rotational speed Ni), wherein the increase is caused upon start of the inertia phase at the time point t2 (see FIG. 9). The amount of increase of the MG2 rotational speed Nm is an amount of increase of the MG2 rotational speed Nm from its synchronized rotational speed in a pre-shift stage in which the second speed AT gear position is established. When the racing amount is large, the learning value LRN is increased to increase the engagement stand-by pressure α. When the racing amount is small, the learning value LRN is reduced to reduce the engagement stand-by pressure α. Since a racing of the engine rotational speed Ne is caused in correspondence with the racing of the MG2 rotational speed Nm, it is also possible to execute the learning control operation for the engagement stand-by pressure α, based on the racing amount of the engine rotational speed Ne. Further, the learning control operation for the engagement stand-by pressure α can be executed also based on, in place of the racing amount, a racing time that is a length of time for which the racing is caused.

Figures 10, 11:
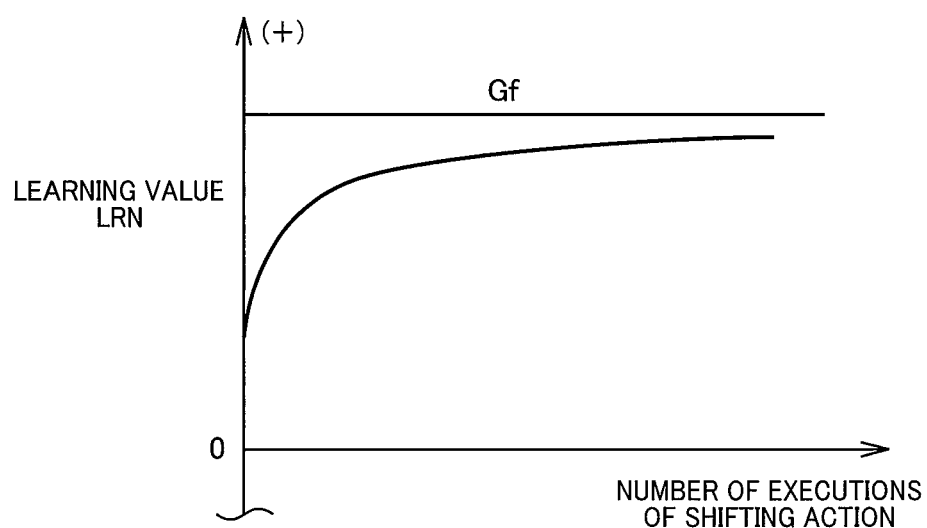
FIG. 10 is a view for explaining a learning value LRN that is obtained through a learning control operation executed by a shift learning portion (shown in FIG. 1), for engagement stand-by pressure a of a clutch C2.
FIG. 11 is a view for explaining a guard value Gf by which the learning value LRN (see FIG. 10) is to be limited.

The shift learning portion 100 stores the learning value LRN in a storage device. In the next implementation of the shift-up action from 2nd to 3rd, the AT shift control portion 96 compensates the engagement stand-by pressure α by the learning value LRN stored in the storage device, so as to control engagement of the clutch C2. The learning value LRN is updated each time the shift-up action from 2nd to 3rd is executed, and the learning value LRN is converged to a substantially constant value as a result of repeated execution of the learning control operation. That is, the shifting action becomes to be executed in the target state in which the racing amount is held within the predetermined target range, owing to the repeated execution of the learning control for the engagement stand-by pressure α. FIG. 10 shows an example of the learning value LRN which is set to a value which varies depending on a level of the accelerator opening degree θacc that is a vehicle state. In the example shown in FIG. 10, the learning value LRN is set to four values that correspond to respective four levels of the accelerator opening degree θacc. The learning value LRN may be set to a value which varies depending on a level of another vehicle state such as the throttle opening degree θth, in place of depending on the level of the accelerator opening degree θacc. The AT shift control portion 96 corresponds to a shift control portion configured to execute the shift control operation of the step-variable transmission portion 20 as the automatic transmission, and also corresponds to a learning-value-use control portion configured to execute a certain control operation (the shift control operation in the present embodiment) by using the learning value LRN that is obtained by the shift learning portion 100.

Further, the shift learning portion 100 limits the learning value LRN such that the learning value LRN is held within a range define by a predetermined guard value Gf. FIG. 11 is a view for explaining the limitation made by the guard value Gf. In the view of FIG. 11, a positive (+) side limit (upper limit) of the range is indicated, and its abscissa represents the number of executions of the shifting action. FIG. 11 shows, by way of example, change of the learning value LRN from an initial stage of execution of the learning control operation. As shown in FIG. 11, the learning value LRN is increased at a high rate in the initial stage, and then the rate of the increase is gradually reduced and eventually converged to a substantially constant value. In a case shown in FIG. 11, the learning value LRN, which is obtained through the learning control operation, is a positive value which is within the range defined by the guard value Gf, namely, which is not larger than the guard value Gf that is a positive value, and is kept unchanged. In a case (not shown in FIG. 11) in which the learning value LRN is deviated from the range defined by the guard value Gf, namely, in which the learning value LRN is increased to be larger than the guard value Gf as the positive value, the learning value LRN is limited to be not larger than the guard value +Gf, so that the guard value Gf is made equal to the guard value +Gf (LRN=+Gf) in the present embodiment. As well as the positive (+) side limit (upper limit) of the range, a negative (−) side limit (lower limit) of the range is defined by a guard value −Gf that is a negative value whose absolute value is equal to an absolute value of the guard value +Gf, so that the learning value LRN is limited such that the learning value LRN is not smaller than the negative guard value −Gf and is not larger than the positive guard value +Gf (−Gf≤LRN≤+Gf). It is noted that the positive guard value and the negative guard value may be different from each other in absolute value.

In place of the engagement stand-by pressure α, any other control parameters such as the stand-by time β and the change rate γ may be subjected to the learning control operation. Further, an engagement stand-by pressure, a stand-by time and a change rate in a control pattern of the hydraulic command value of the brake B1 as one of the frictional engagement devices that is to be released in the execution of shift-up action from 2nd to 3rd may be subjected to the learning control operation. In each of the other shifting actions (shift-up actions and shift-down actions) other than the shift-up action from 2nd to 3rd, too, a certain control parameter or parameters (such as the above-described engagement stand-by pressure α, stand-by time β and change rate γ) relating to the engaging hydraulic pressure Pcb of any one of the engagement devices CB that is to be engaged or released, are subjected to the learning control operation.

Referring back to FIG. 1, in the vehicle 10, some or all of the programs and data of the electronic control apparatus 90, which are provided for executing the above-described control operations, are updated by a vehicle-software updating system 110. The vehicle-software updating system 110 includes a pair of gateway ECUs, i.e., first and second gateway ECUs 120, 126 that are provided apart from the electronic control apparatus 90. Each of the first and second gateway ECUs 120, 126 is constituted by an electronic control apparatus that includes a so-called microcomputer incorporating a CPU, a ROM, a RAM and an input-output interface.

Each of the first and second gateway ECUs 120, 126 is configured to update the guard value Gf relating to the learning control operation executed by the shift learning portion 100, and to update also the shift control program, in accordance with which the AT shift control portion 96 is to execute the hydraulic control operation using the learning value LRN. To this end, each of the first and second gateway ECUs 120, 126 obtains, from the external device, update softwares for updating the guard value Gf and the shift control program, so as to update the guard value Gf and the shift control program, concurrently with each other. In general, the guard value Gf is updated, as needed, such that the shift control operation can be appropriately executed in accordance with the updated shift control program. Each of the first and second gateway ECUs 120, 126 corresponds to "update control portion" recited in the appended claims. Further, the first and second gateway ECUs 120, 126 cooperate with the electronic control apparatus 90, which functionally includes the AT shift control portion 96 and the shift learning portion 100, to constitute "control apparatus" that is recited in the appended claims.

The first gateway ECU 120 serves as a wireless update portion, and is capable of transmitting and receiving information to and from a server 124 of a software distribution center as an external device, via wireless transceivers 122, 125, so as to download a new update software or softwares, as needed, from the server 124 and update the softwares (programs and data) of the electronic control apparatus 90. The software distribution center is provided by, for example, a manufacturer of the vehicle 10, and is capable of transmitting and receiving information to and from the first gateway ECU 120 through a wireless communication using, for example, a mobile phone network and a wireless LAN network. The above-described external-network communication antenna 82 also may be used in place of the wireless transceiver 122.

Figure 12:
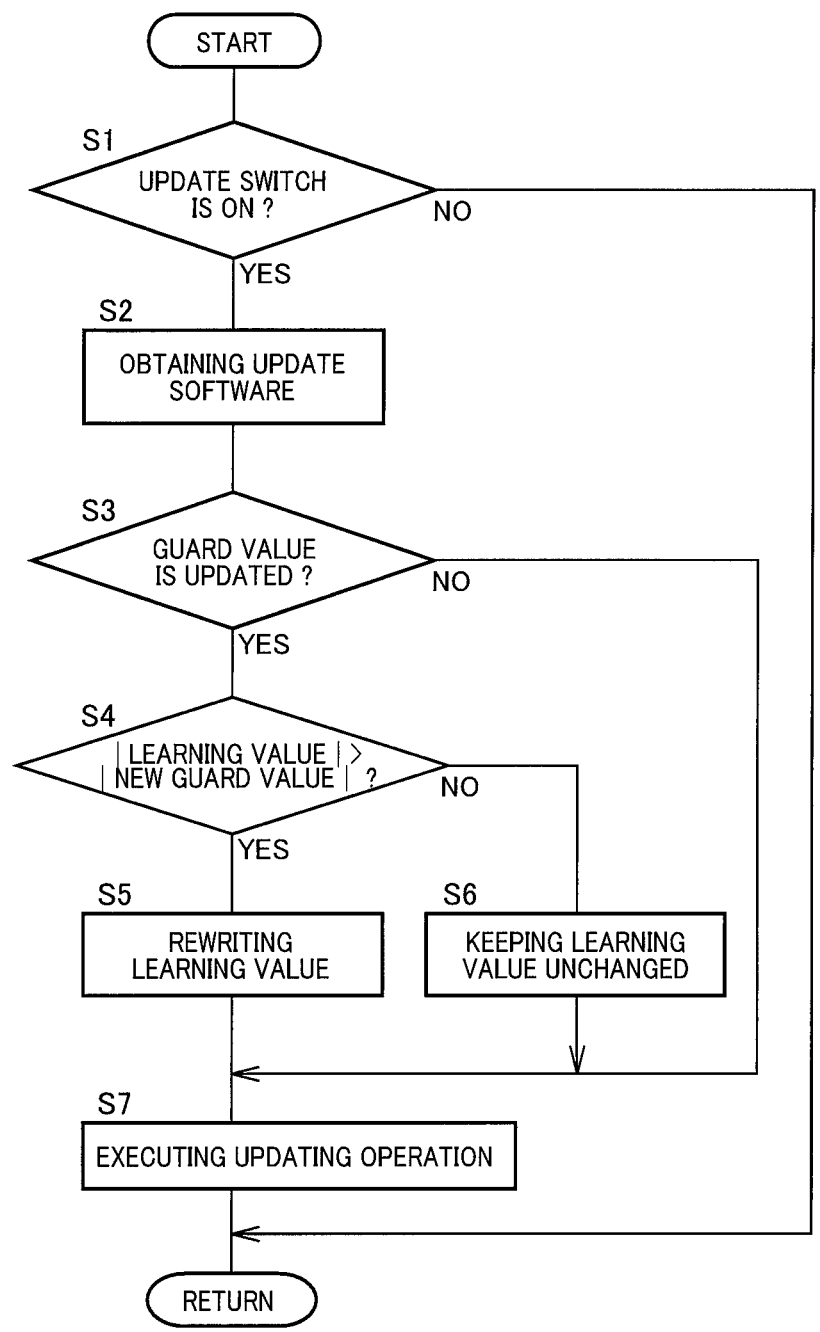
FIG. 12 is a flow chart for explaining an updating operation that is executed by a first gateway ECU (shown in FIG. 1), for updating softwares.

The first gateway ECU 120 executes a signal processing, i.e., a control routine for updating the guard value Gf and the shift control program, wherein the control routine includes steps S1 through S7 that are shown in flow chart of FIG. 12. The control routine is initiated with step S1 that is implemented to determine whether an update switch has been operated to be turned ON, namely, whether an update command has been issued. When the update command has not been issued, one cycle of execution of the control routine is completed. When the update command has been issued, the control routine goes to step S2 and subsequent steps. At step S1, specifically, it is determined that the update command has been issued when an update button 146 on an update selection panel 140 (see FIG. 13) displayed in the display device 89 has received a touch operation, and it is determined that the update command has not been issued when an end button 148 on the update selection panel 140 has received a touch operation.

Figure 13:
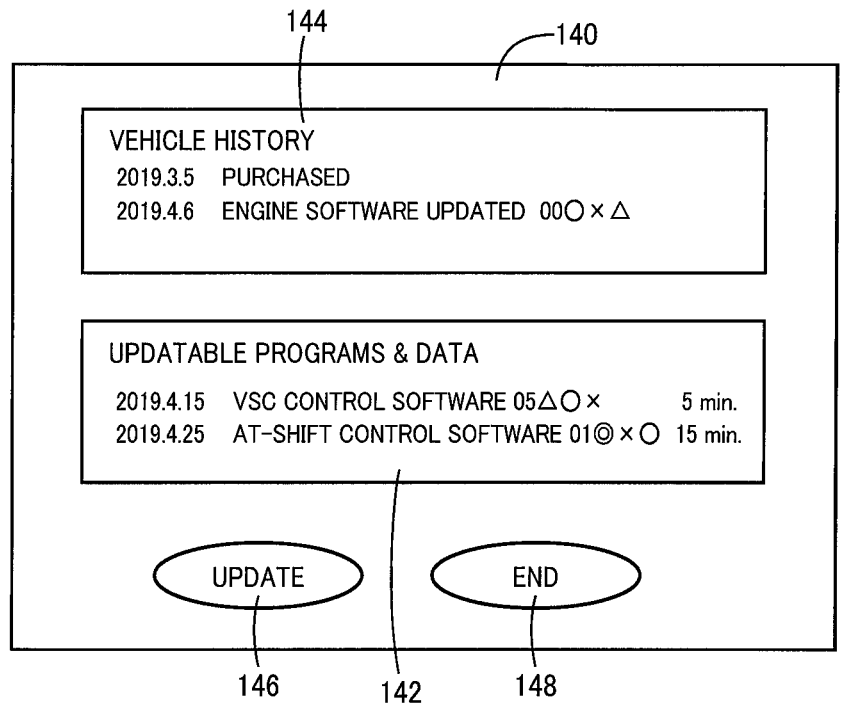
FIG. 13 is a view for explaining examples of update softwares, which are indicated in a display device of the vehicle upon determination at step S1 (shown in FIG. 12)

The update selection panel 140 of FIG. 13 is displayed in the display device 89, for example, when a new update software or softwares are uploaded to the server 124. The update selection panel 140 is provided with an updatable-information indicating portion 142 indicating "UPDATABLE PROGRAMS & DATA" and an update-history-information indicating portion 144 indicating "VEHICLE HISTORY". The updatable-information indicating portion 142 is provided to indicate all update softwares by which corresponding program or data is currently updatable. In FIG. 13, the updatable-information indicating portion 142 indicate, by way of examples, two available softwares in the form of "VSC CONTROL SOFTWARE . . . " and "AT-SHIFT CONTROL SOFTWARE . . . ", together with a date from which the corresponding software is updatable and a time required to update the corresponding program. The "AT-SHIFT CONTROL SOFTWARE . . . " is an update software that is to be used for updating the shift control program (in accordance with which the shifting operations are to be executed in the AT shift control portion 96), and may either include or exclude update of the guard value Gf. The information of the "UPDATABLE PROGRAMS & DATA" is automatically supplied to the server 124 from the first gateway ECU 120 in a successive manner, and the received information is indicated in the updatable-information indicating portion 142. The "UPDATABLE PROGRAMS & DATA" (update softwares) are selectable by, for example, a touch operation, independently of each other, so that a user of the vehicle 10, a maintenance shop engineer of a car dealer, or the like selects one or ones of the update softwares and applies the touch operation to the update button 146, so as to update the corresponding program or programs. The operation for selecting one or ones of the update softwares and the touch operation to the update button 146 correspond to update command operations. The update-history-information indicating portion 144 is provided to indicate, in addition to a vehicle history such as a purchase date of the vehicle 10, information relating to history of updates of the softwares, so that the history of updates of the programs and data can be confirmed at a glance. The history of updates of the programs and data is stored in an update-history-information storing portion (not shown) each time it is updated.

The step S1 is followed by step S2 that is implemented to download the selected one or ones of the update softwares from the server 124, so as to obtain the selected one or ones of the update softwares. Then, step S3 is implemented to determine whether the downloaded update software or softwares include update of the guard value Gf for the learning control operation, namely, whether the downloaded update software or softwares include a new guard value Gfa to which the current guard value Gf is to be updated. When the new guard value Gfa is not included in the downloaded update software or softwares, the control flow goes to step S7 that is implemented to execute an updating operation by which a corresponding one or ones of the softwares (through which the electronic control apparatus 90 execute the various control operations) is updated by the downloaded update software or softwares.

When an affirmative determination (YES) is made at step S3, namely, when the new guard value Gfa is included in the downloaded update software or softwares, step S4 is implemented to determine whether an absolute value of the current learning value LRN determined by the learning control operation is larger than an absolute value of the new guard value Gfa, namely, whether the current learning value LRN is deviated from a new guard-value range defined by the new guard value Gfa. When the current learning value LRN is deviated from the new guard-value range defined by the new guard value Gfa, step S5 is implemented to limit the learning value LRN such that the learning value LRN is held within the new guard-value range defined by the new guard value Gfa. For example, when the learning value LRN is larger than the new guard value Gfa that is a positive value (LRN>+Gfa), the learning value LRN is made equal to the new guard value Gfa (LRN=+Gfa). When the learning value LRN is smaller than the new guard value Gfa that is a negative value (LRN>−Gfa), the learning value LRN is made equal to the new guard value Gfa (LRN=−Gfa). In the new guard value Gfa, too, as well as in the guard value Gf, the positive guard value and the negative guard value may be different from each other in absolute value. On the other hand, when the absolute value of the current learning value LRN is not larger than the absolute value of the new guard value Gfa, namely, when the current learning value LRN is within the new guard-value range defined by the new guard value Gfa (−Gfa≤LRN≤Gfa), the control flow goes to step S6 in which the current learning value LRN is kept unchanged. Step S5 or Step S6 is followed by step S7 that is implemented to execute the updating operation.

Figure 14:
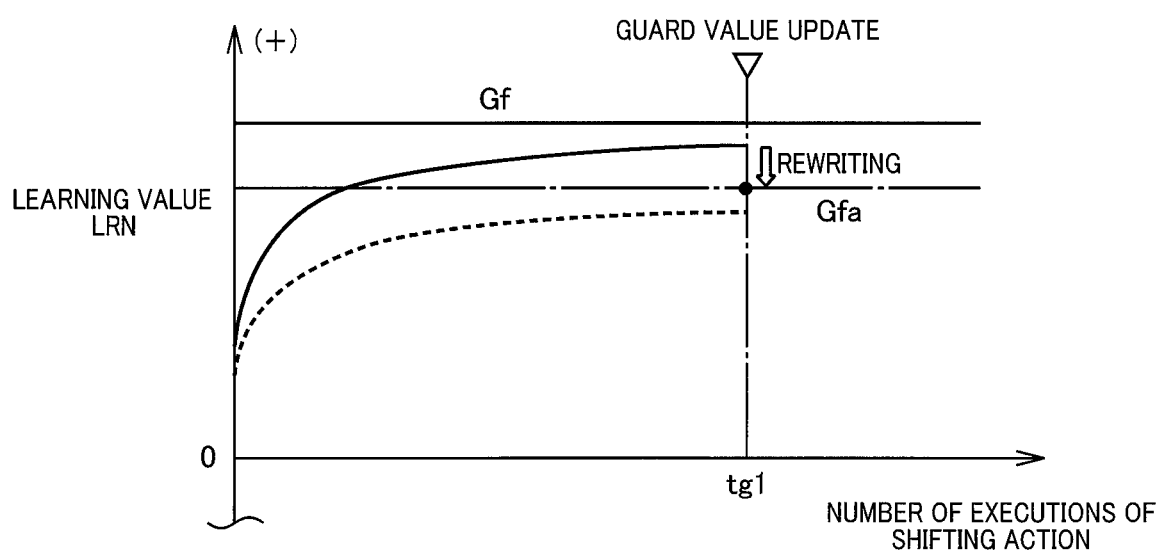
FIG. 14 is a view for explaining a case (solid line) in which the learning value LRN is rewritten to another value at step S5 (shown in FIG. 12) as a result of update of the guard value and also another case (broken line) in which the learning value LRN is kept unchanged in spite of the update of the guard value.

FIG. 14 shows a case in which the guard value Gf is updated to the new guard value Gfa at a time point tg1. When the learning value LRN is deviated from the new guard-value range defined by the new guard value Gfa (LRN>+Gfa) as indicated by solid line, step S5 is implemented to rewrite the learning value LRN to a value equal to the new guard value Gfa whereby the learning value LRN is made equal to the new guard value Gfa (LRN=Gfa). On the other hand, when the learning value LRN is within the new guard-value range defined by the new guard value Gfa (−Gfa≤LRN≤Gfa) as indicated by broken line, step S6 is implemented whereby the current learning value LRN is kept unchanged.

The second gateway ECU 126 serves as a wire update portion, and includes a connector 128 to and from which an update tool 130 is mechanically connectable and disconnectable via a wire or cable. The update tool 130 stores therein available update softwares that have been downloaded, for example, from the server 124 through a wire or wireless communication. In the present embodiment, the update tool 130 is provided in each car dealer who deals the vehicle 10. The update tool 130 is synchronized with the server 124 of the software distribution center at least in terms of the update softwares relating to the vehicle 10. The connector 128 is provided, for example, in vicinity of a driver's seat of the vehicle 10. When the update tool 130 is connected to the connector 128 by, for example, a maintenance shop engineer, a signal processing similar to that shown in the flow chart of FIG. 12 is initiated by the second gateway ECU 126, it is possible to update the various softwares (programs and data) of the electronic control apparatus 90, which include the shift control program and the guard value Gf. In this case, since the update softwares are obtained from the update tool 130 as the external device at a step equivalent to step S2 shown in the flow chart of FIG. 12, even when a software update cannot be appropriately made through the wireless communication, the software update can be reliably made with use of the update tool 130 that is mechanically connected to the connector 128. It can be considered that the above-described electronic control apparatus 90 and first and second gateway ECUs 120, 126 (which cooperate to constitute the control apparatus) cooperate with the above-described server 124 and update tool 130 as the external devices, to constitute a vehicle control system.

As described above, in the vehicle 10 according to the present embodiment, when the new guard value Gfa is obtained from the external device (the server 124 or the update tool 130) and the previous guard value Gf has been updated to the new guard value Gfa, the learning value LRN is limited by the new guard value Gfa, prior to execution of the learning control operation. That is, in a case in which the learning value LRN is deviated from the new guard value Gfa range, the learning value LRN is rewritten to a value within the new guard-value range defined by the new guard value Gfa (step S5). In a case in which the learning value LRN is within the new guard-value range, the learning value LRN is kept unchanged (step S6) so that outcomes obtained through the executed learning control operation is maintained. Thus, even shortly after the update of the guard value Gf, the shift control operation using the learning value LRN can be appropriately executed.

Further, the update software relating to the shift control program (in accordance with which the AT shift control portion 96 is to execute the shift control operation by using the learning value LRN) is obtained together with the new guard value Gfa, and the shift control program is updated concurrently with update of the guard value Gf to the new guard value Gfa. The guard value Gf is updated to the new guard value Gfa, as needed, such that the shift control operation can be appropriately executed in accordance with the updated shift control program. Thus, with the learning value LRN being limited by the new guard value Gfa prior to execution of the learning control operation or the shift control operation, the shift control operation using the learning value LRN can be appropriately executed in accordance with the updated shift control program, even shortly after the update of the guard value Gf.

Further, the first gateway ECU 120 obtains the update software including the new guard value Gfa by downloading the update software from the server 124 via the wireless communication. Thus, the update of the guard value Gf can be made in a simple manner.

Further, in the present embodiment, the AT shift control portion 96 executes the shift control operation in the step-variable transmission portion 20 provided in the vehicle 10, in accordance with the shift control program, by controlling the hydraulic pressure Pcb of the engagement device CB that is involved in the shift control operation, and the engagement stand-by pressure α as the control parameter relating to the hydraulic pressure Pcb of the engagement device CB is subjected to the learning control operation such that the shift control operation is executed in the predetermined target state. When the shift control program is updated, the guard value Gf is also updated to the new guard value Gfa, as needed, such that the shift control operation can be appropriately executed in accordance with the updated shift control program. Therefore, upon updates of the shift control program and the guard value Gf, if the learning value LRN is deviated from the new guard-value range defined by the new guard value Gfa, a shifting trouble such as a shifting shock could be caused in execution of the shift control operation in accordance with the updated shift control program. However, owing to the feature of the present invention, which is that the learning value LRN is limited by the new guard value Gfa prior to the execution of the learning control operation or the shift control operation, the shift control operation using the learning value LRN can be appropriately executed in accordance with the updated shift control program, even shortly after the update of the guard value Gf, so that it is possible to prevent the shifting trouble such as the shifting shock Further, in the present embodiment, the control apparatus includes, in addition to the first gateway ECU 120 configured to update the software via the wireless communication, the second gateway ECU 126 configured to update the software via the wire communication, so that, even when a software update cannot be appropriately made through the wireless communication, the software update can be reliably made with use of the mechanically connectable update tool 130. It is noted that the provisions of both of the first and second gateway ECUs 120, 126 are not essential. That is, both of the first and second gateway ECUs 120, 126 do not have to be necessarily provided as long as at least one of the first and second gateway ECUs 120, 126 is provided so that the control program and the guard value Gf can be updated through at least one of the wireless communication and the wire communication.

While the preferred embodiment of this invention has been described in detail by reference to the drawings, it is to be understood that the embodiment described above are given for illustrative purpose only, and that the present invention may be embodied with various modifications and improvements which may occur to those skilled in the art.

NOMENCLATURE OF ELEMENTS

10: vehicle
20: mechanically-operated step-variable transmission portion (automatic transmission)
90: electronic control apparatus (control apparatus)
96: AT shift control portion (shift control portion, learning-value-use control portion)
100: shift learning portion (learning control portion)
120: first gateway ECU (update control portion, control apparatus)
124: server (external device)
126: second gateway ECU (update control portion, control apparatus)
130: update tool (external device)
C1, C2: clutches (hydraulically-operated frictional engagement devices)
B1, B2: brakes (hydraulically-operated frictional engagement devices)
α: engagement stand-by pressure (control parameter)
LRN: learning value
Gf: guard value
Gfa: new guard value

What is claimed is:

1. A control apparatus for a vehicle, the control apparatus comprising:
   a learning control portion configured to execute a learning control operation, and to limit a learning value obtained through the learning control operation, by a guard value;
   an update control portion configured to obtain a new guard value from an external device, and to update the guard value to the new guard value,
      wherein the update control portion limits the learning value by the new guard value, prior to execution of the learning control operation, such that the learning value is rewritten, by the update control portion, to a value within a new guard-value range defined by the new guard value in a case in which the learning value is deviated from the new guard-value range, and such that the learning value is kept unchanged by the update control portion in a case in which the learning value is within the new guard-value range,
   wherein the learning control portion stores the learning value determined depending on a value inputted to the control apparatus, and
   wherein the guard value is set to a value for limiting the stored learning value so as to be held within a predetermined range; and
a shift control portion configured to execute a shift control operation in an automatic transmission provided in the vehicle, in accordance with a shift control program, by controlling a hydraulic pressure of a hydraulically-operated frictional engagement device that is involved in the shift control operation,
   wherein the learning control portion executes the learning control operation for a control parameter relating to the hydraulic pressure of the hydraulically-operated frictional engagement device, such that the shift control operation is executed in a predetermined target state,
   wherein the learning control portion limits the learning value of the control parameter by the guard value,
   wherein the shift control portion controls the hydraulic pressure of the hydraulically-operated frictional engagement device, by using the learning value of the control parameter, and
   wherein the update control portion obtains, from the external device, an update software relating to the shift control program and the guard value, and updates the shift control program and the guard value, concurrently with each other.

2. The control apparatus according to claim 1, comprising a learning-value-use control portion configured to execute a certain control operation by using the learning value, in accordance with a control program,
   wherein the update control portion obtains, from the external device, an update software relating to the control program, together with the new guard value, and updates the control program concurrently with update of the guard value to the new guard value.

3. The control apparatus according to claim 1,
   wherein the update control portion downloads, from the external device via a wireless communication, an update software including the new guard value, and updates the guard value to the new guard value.

4. The control apparatus according to claim 1, comprising a learning-value-use control portion configured to execute a certain control operation by using the learning value, in accordance with a control program,
   wherein the update control portion obtains, from the external device, an update software relating to the control program, together with the new guard value, and updates the control program concurrently with update of the guard value to the new guard value, and
   wherein the update control portion limits the learning value by the new guard value, prior to execution of the certain control operation by the learning-value-use control portion.

* * * * *